United States Patent
Render et al.

(10) Patent No.: US 12,494,967 B2
(45) Date of Patent: Dec. 9, 2025

(54) ZERO TOUCH PROVISIONING ORCHESTRATION OF OPEN RAN (O-RAN) COMPONENTS

(71) Applicant: DISH Wireless L.L.C., Littleton, CO (US)

(72) Inventors: Zeev Render, Ashburn, VA (US); Valois Gonzalez, Littleton, CO (US); Arnold Agcaoili, Littleton, CO (US); Sumukha Katta Prasanna Kumar, Littleton, CO (US); Vassilka Kirova, Nutley, NJ (US)

(73) Assignee: DISH Wireless L.L.C., Littleton, CO (US)

( * ) Notice: Subject to any disclaimer, the term of this patent is extended or adjusted under 35 U.S.C. 154(b) by 0 days.

(21) Appl. No.: 18/479,628

(22) Filed: Oct. 2, 2023

(65) Prior Publication Data

US 2025/0112827 A1 Apr. 3, 2025

(51) Int. Cl.
| | |
|---|---|
| *H04L 41/08* | (2022.01) |
| *H04L 41/0806* | (2022.01) |
| *H04L 41/0895* | (2022.01) |
| *H04L 41/40* | (2022.01) |
| *H04W 16/18* | (2009.01) |

(52) U.S. Cl.
CPC ......... *H04L 41/0886* (2013.01); *H04W 16/18* (2013.01)

(58) Field of Classification Search
CPC ............. H04L 41/0886; H04L 41/0806; H04L 41/0895; H04L 41/40; H04W 16/18
See application file for complete search history.

(56) References Cited

U.S. PATENT DOCUMENTS

| | | | |
|---|---|---|---|
| 10,680,913 B1 * | 6/2020 | Achi Vasudevan | H04L 63/20 |
| 2024/0179061 A1 * | 5/2024 | Shrinagar | H04L 41/0806 |

FOREIGN PATENT DOCUMENTS

| | | | | |
|---|---|---|---|---|
| WO | WO-2023244257 A1 * | 12/2023 | | H04W 28/16 |
| WO | WO-2024123328 A1 * | 6/2024 | | H04L 61/5014 |

* cited by examiner

*Primary Examiner* — Kamal M Hossain
(74) *Attorney, Agent, or Firm* — Kilpatrick Townsend & Stockton LLP

(57) ABSTRACT

In various embodiments, orchestration of zero touch provisioning (ZTP) in a cloud based 5G system in provided. In some embodiments, a ZTP orchestrator (ZTPO) receives a request to perform zero-touch provisioning (ZTP) associated with deployment/configuration of a cell site. One or more ZTP pipelines that perform ZTP operations associated with the deployment/configuration of the cell site are executed. The execution of the one or more ZTP pipelines are monitored and one or more results associated with the execution of the one or more ZTP pipelines determined. Feedback information based on the one or more results of the ZTP operations is determined.

20 Claims, 16 Drawing Sheets

ZERO TOUCH PROVISIONING ORCHESTRATION OF OPEN RAN (O-RAN) COMPONENTS

BACKGROUND

Zero-touch provisioning (ZTP) is a method of setting up devices that automatically configures the device using a switch feature. ZTP helps IT teams quickly deploy network devices, eliminating most of the manual labor involved with adding them to a network. ZTP can be found in devices and tools such as network switches, routers, wireless access points and firewalls. The goal of ZTP is to enable IT personnel and network operators to configure networking devices without manual intervention. Manual configuration takes time and is prone to human error—especially if many devices must be configured at scale. ZTP is faster in this case, reduces the chance of error and ensures configuration consistency. ZTP can also be used to automate the system updating process.

Open Radio Access Network (O-RAN) is a concept based on interoperability and standardization of RAN elements including a unified interconnection standard for white-box hardware and open-source software elements from different vendors. Open RAN architecture integrates a modular base station software stack on off-the-shelf hardware which allows baseband and radio unit components from different suppliers to operate seamlessly together. O-RAN decouples hardware and software implementations allowing vendors (hardware, software, and systems) to focus on providing components rather than a complete solution. By disaggregating and splitting the RAN, O-RAN standardizes open and interoperable interfaces, and allows key functions to run as virtualized software functions on vendor-neutral hardware, an environment evolves where networks can be deployed with a more modular design.

SUMMARY

In accordance with the present disclosure, a computer system configured to orchestrate zero-touch provisioning (ZTP) of components of an open radio access network (O-RAN) is provided. In various embodiments, the computer system includes a processor engine/workflow configured to automate the host-level configuration customized to particular NF requirements, platform components installation and configuration, dedicated NF instantiation [to be completed once specification is finalized].

Other embodiments are contemplated.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
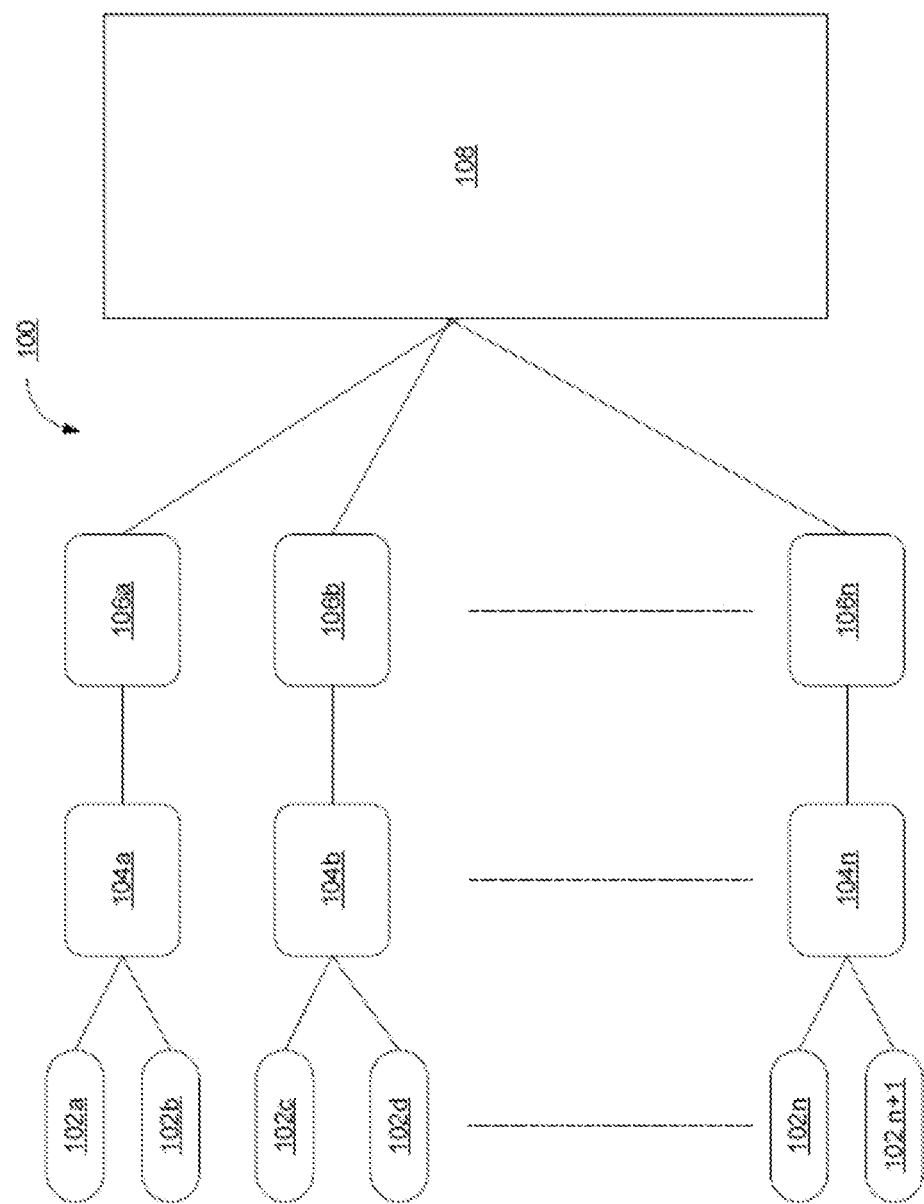
FIG. 1 generally illustrates an example of an O-RAN in accordance with the present disclosure.

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

One of the key benefits of Open RAN is how it powers innovation, and automation is a driver of this innovation. Cloud-native automation tools such as Continuous Integration/Continuous Delivery (CI/CD), Zero-Touch Provisioning (ZTP), Cloud Automation, Artificial Intelligence (AI) and Machine Learning (ML) enable the creation of agile, flexible, elastic, and efficient applications in modern, dynamic Open RAN environments. When automation becomes a key feature of an ALL G Open RAN solution, Mobile Network Operators (MNOs) reap the benefits of not only flexibility of choice and cost savings, but also the agility, scalability, ease of management and upgradeability that comes with the promise of a cloud-native Open RAN solution.

Automated Orchestration and Management is a key to benefit from a cloud-native Open RAN solution. Using techniques described herein, automated orchestration of ZTP of components within an O-RAN using modern tools and technologies can provide several advantages and help at different stages of network deployment, from preparation to rollout of a new network or service, then operating and monitoring the network after roll-out. Automation is also important when it comes to termination or scaling down the network.

One insight provided by the present disclosure is the use of a ZTP orchestrator (ZTPO) that manages ZTP pipelines (which may also be referred to herein as "workflows") to automatically configure an O-RAN network (e.g., a 5G O-RAN). The ZTP pipelines orchestrated by the ZTPO can include various workflows for setting up devices in a core network of the O-RAN (e.g., within a cloud environment) as well as setting up devices in individual cell sites facilitating the O-RAN. In various examples, the ZTPO can orchestrate pipelines, such as, but not limited to computer host provisioning (CHP) pipelines, virtual server management provisioning (VSMP) pipelines (e.g., VMware vCenter provisioning (VCP)), node-pool creation (NPC) pipelines, distributed unit instantiation (DUI) pipelines, radio access network (RAN) initiation pipelines, and/or other pipelines. According to some embodiments, the pipelines may be completed in different stages, such as CHP pipeline before executin a VSMP pipeline, and the like.

In various examples, the ZTPO is used to complete one or more of the aforementioned pipelines in deploying a cell site. In some embodiments, the ZTPO kicks off the stages in a predetermined sequence. In this sequence, an earlier stage the ZTP sets up infrastructure in the O-RAN that facilitates a later stage setup. This is akin to setting up core functions/devices in the core network, such as IP assignment capability in the core network, and then moving on to setting up individual cell sites. One advantage of this workflow lies in its scalability to incorporate a variety of vendors into the O-RAN. This workflow can be maintained by an operator/provider of the O-RAN—as opposed to having the vendors develop their own ZTP routines to bring their devices into the O-RAN.

General O-RAN System Example

Open radio access network ("O-RAN") is a standard that allows a telecommunications network with all its functions, except necessary hardware components facilitating radio access, to be implemented in a cloud with automated deployment and operations. FIG. 1 generally illustrates an example system architecture of an O-RAN in accordance with the present disclosure. The example system architecture shown in FIG. 1 is not particularly limited to a type of network—such as 4G or 5G. Although, some embodiments in the present disclosure are described and illustrated in the context of 5G, the example system architecture shown in FIG. 1 is intended to show a general environment in which technologies in accordance with the present disclosure can be applied. One skilled in the art will understand how to apply the technologies in accordance with the present disclosure to a network environment described by the example system architecture shown in FIG. 1.

As shown in FIG. 1, the example system architecture 100 of an O-RAN in accordance with the present disclosure comprises multiple cell sites, such as cell sites 102*a, b, c, d, . . . , n*, n+1. As illustrated in this example, within a given cell site, such as 102*a*, one or more radio units (RU) are installed in the O-RAN in accordance with the present disclosure. A given one of the RUs in the given cell site comprises hardware components such as radio frequency (RF) transceivers, antennas configured to transmit and receive RF signals from/to end user equipment (UE), such as smartphones. In various implementations, RUs in different cell sites in the example system architecture 100 can be provided by different hardware vendors. It is contemplated that in some embodiments, the cell sites in the example system architecture 100 are heterogenous in terms of hardware they are implemented in.

Also shown in FIG. 1 are distributed units (DUs) 104*a*, 104*b* . . . and 104*n*. A given one of the DUs, such as 104*a* in this example, is configured to facilitate real-time baseband processing function. Various protocols can be configured into the given DU, such as RLC, PDCP MAC and/or any other lower-level protocols. In various implementations, the given DU is configured to communicate with at least one RU in a cell site. For example, as shown in this example, the DU 104*a* is configured to communicate with the RUs in cell sites 102*a* and 102*b*, the DU 104*b* is configured to communicate with the RUs in cell sites 102*c* and 102*d*, and DU 104*n* is configured to communicated with the RUs in cell sites in 102*n* and 102*n*+1. The communications illustrated between the DUs and the cell sites in FIG. 1 are merely illustrative and thus should not be understood as limiting a scope of the O-RAN in accordance with the present disclosure. That is, the O-RAN in accordance with the present disclosure is not limited to one DU connected only to two cell sites as illustrated in FIG. 1. One skilled in the art understands that the O-RAN in accordance with the present disclosure can comprise a DU configured to however many cell sites.

A given communication link between a given DU and given RU in a cell site is typically referred to as a fronthaul haul—for example, the links between cell sites 102*a/b* and DU 104*a*. In that example, the DU 104*a* is configured to consolidate and process inbound traffic from RUs in the cell sites 102*a/b*, distributes traffic to the RUs in the cell sites 102*a/b*. In implementations, the DUs can be located near the cell sites they have communication with or centralized in a local data center provided by a vendor. In some implementations, various functionalities in the DUs can be implemented using software.

Also illustrated in FIG. 1 are centralized units (CUs), such as CU 106*a*, 106*b*, and 106*n*. A given one of the CUs is configured to handle higher layers of communication protocols as compared to a DU. For example, less time-sensitive packet processing, such as SDAP, RRC or PDCP, may be implemented in the given CU. Functionality split between CU and DU is not intended to be specifically limited in the present disclosure. It is understood that such a split can be a design choice for a particular O-RAN. That is, the present disclosure should not be understood as being limited to a specific version or specific versions of O-RAN, where splits between CU and DU are specifically defined. For example, the DU can be co-located with the CU, or the DU can be bundled with the RU. The DU can also run standalone. Collectively, RUs, DUs, and a CU can create a gNodeB, which serves as a radio access network (RAN) of example system architecture 100.

In implementations, CUs in an O-RAN in accordance with the present disclosure can be implemented using software. In some embodiments, the given CU may be located in a data center provided by a third-party vendor. In some embodiments, one or more of the given CU can be located in the data center. The individual links between a CU and DU is typically referred to as a midhual link, for example the link between 104a and 106a shown in this example.

FIG. 1 also shows a core network 108. The core network 108 is configured to enable end users to access services such as phone calls, internet, etc. In various embodiments, the core network 108 is configured to handle operations such as subscriber location, profile, authentication, and/or any other operations. In those embodiments, such operations can facilitate the end users to employ communication technologies (such as 5G) through the example system architecture 100. In some embodiments, the services and/or operations provided by the core network 108 are implemented using software. Although only one core network 108 is shown in FIG. 1, this is not intended to be limiting. It should be understood the example system architecture 100 is not intended to be limited to 5G. It is understood embodiments provided herein can be applied to other types of cell sites when appropriate, such as LTE, 3G, 6G, WIFI or any other types of networks.

In various other examples, more than one core network 108 can be included in the O-RAN in accordance with the present disclosure. Links between a CU and the core network 108 are typically referred to as backhaul links, for example, the link between CU 106a and core network 108 shown in this example. The fronthaul links, midhaul links, and backhaul links shown in FIG. 1 may be collectively referred to as a transport layer for the example system architecture 100. In various embodiments, the transport layer is configured to handle end-to-end communication over the O-RAN in accordance with the present disclosure.

Figure 2:
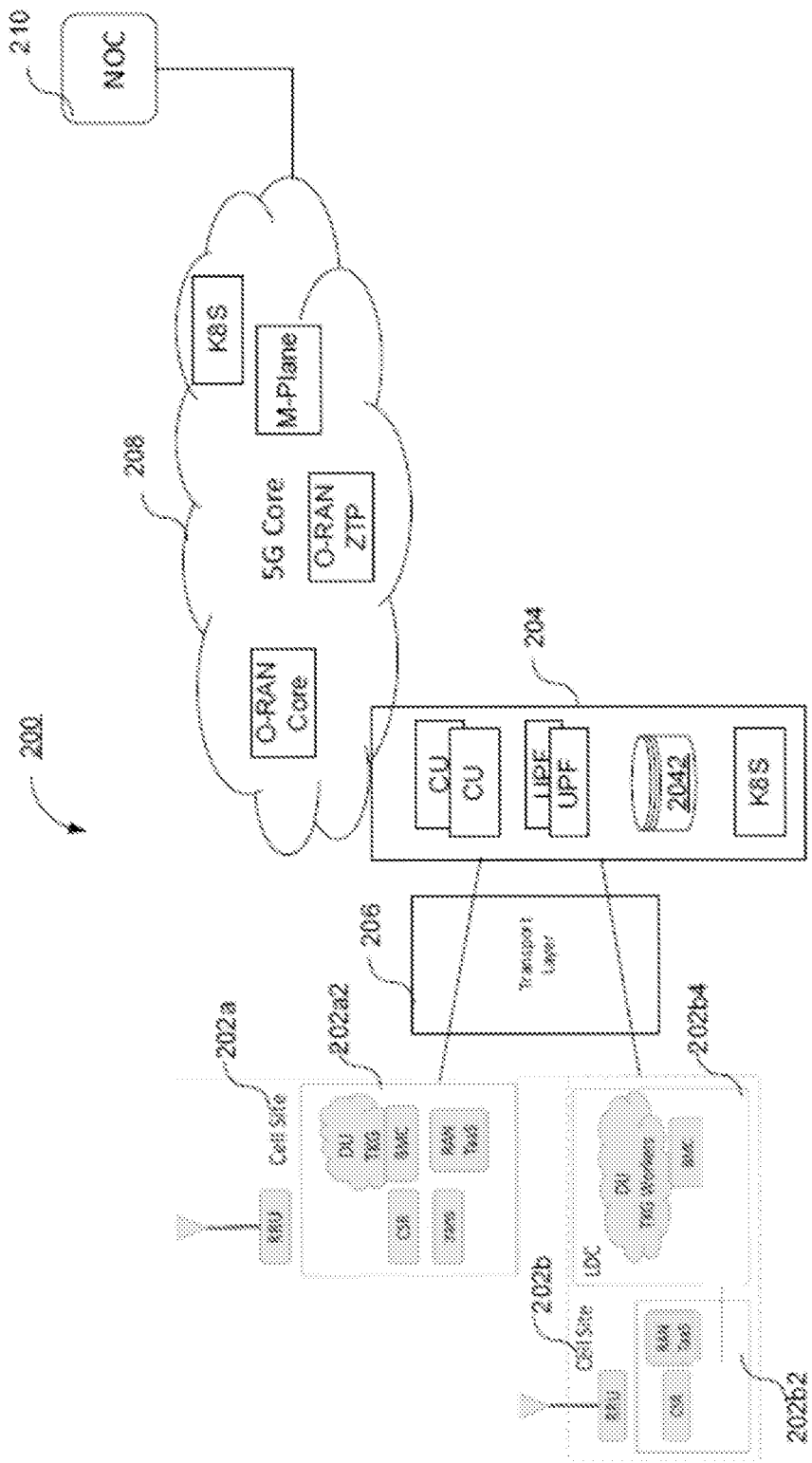
FIG. 2 illustrates an embodiment of a 5G O-RAN in accordance with the present disclosure.

With an example system architecture 100 of O-RAN in accordance with the present disclosure having been generally described and illustrated, attention is now directed to FIG. 2, where an example system architecture 200 of a 5G O-RAN implement in a cloud is generally illustrated.

Example System Architecture of 5G O-RAN

As shown FIG. 2, the example system architecture 200 of a 5G O-RAN comprises a cell site 202a, a cell site 202b, and/or any other cell site(s). As shown, each of the cell site 202a, and 202b, in this example, includes a remote radio unit (RRU). In this example, one or more computing devices, located outside the cell site 202a, are configured to implement a cell site router (CSR), a DU, a bare metal compute (BMC), a RAN TaaS (test as a service), and/or any other components. In some embodiments, the computing device includes a processor configured to implement various components mentioned above. In one embodiment, the computing device(s) 202a2 includes an operating system such as a Linux system to implement these components. In that embodiment, the computing device(s) 202a2 is located in a cabinet within a proximity of the cell site 202a. In that embodiment, the cell site 202a is referred to as a "lite site".

The cell site 202b includes a computing device 202b2 and another computing device 202b4. In this example, the computing device 202b2 are located within the cell site 202b, and computing device 202b4 is located in a local data center (LDC). In one embodiment, the computing device 202b2 is located in a cabinet within the cell site 202b. In that embodiment, the cell site 202b is referred to as a "dark site".

As shown, in this example, the computing device 202b2 is configured to implement the CSR, RAN TaaS, and/or any other components, while the computing device 202b4 is configured to implement the DU (for example, hosting Tanzu Kubernetes Grid (TKG)), BMC, and/or any other components. This is to show cell sites in a 5G O-RAN in accordance with the present disclosure can have computing devices located within the cell sites and configured to implement various components whose functionalities attributed to the DU, CSR or RAN TaaS. That is, the 5G O-RAN in accordance with the present disclosure is not intended to be limited such that DU and CSR/RAN TaaS are implemented on different computing devices, and/or outside the cell site. In some embodiments, the RAN TaaS for a specific cell site such as 202a or 202b can include tests designed to components and functionalities within the specific cell site, functionalities with another cell site (e.g., adjacency testing), and/or end-to end testing.

In various embodiments, the RAN TaaS shown in this example is implemented using software and is configured to test and ensure one or more O-RAN components—e.g., the RRU or CSR, in the cell sites are performing in compliance with O-RAN standards. Various tests or test suites can be configured into RAN TaaS to cause target components in the cell sites to be run under preset test conditions. A goal of such a test or test suite in the RAN TaaS is to verify that individual components in the cell sites can handle expected traffic and functionality. In some embodiments, tests in the RAN TaaS are run continuously on a preset or configured frequency to ensure the above-mentioned types of testing of the specific cell sites are in compliance with the O-RAN standards continuously.

As shown FIG. 2, the cell sites 202a and 202b are connected, via the transport layer 206, to a data center 204 configured to host one or more CUs, and one or more UPFs (user plane functions) implementing at least one user plane layer, and/or any other components. In one embodiment, the data center 204 is referred to as a breakout edge data center (BEDC). In general, the data center 204 is configured to accommodate the distributed nature of various functions in the example system architecture 200 of a 5G O-RAN. In that embodiment, the BEDC hosts various 5G network functions (NFs) that have low latency requirement. In that embodiment, the BEDC provides internet peering for general 5G service and enterprise customer-specific private network service.

Shown in this example is a storage 2042 configured to store various (Cloud-native Network Functions) CNFs and artifacts for facilitating implementations of the DUs and CUs in the example system architecture 200 of the 5G O-RAN. Examples of the storage 2042 can include Amazon S3, GitHub, Harbor and/or any other storage services. Storage 2042 can be a Docker image repository and local storage which can be utilized for storing logs which are generated by Network Functions hosted in that Data Center.

In some embodiments, such as shown in FIG. 2, the data center 204 can include one or more Kubernetes control plane (also known as K8S) configured to facilitate automation of deployment, scaling, and management of various software/ applications deployed within the data center 204 and/or within one or more cell sites operatively communicating with the data center 204 through the transport layer 206.

5G Core 208 can be implemented such that it is physically distributed across data centers or located at a central national data center (NDC) and/or regional data center (RDC). In this example, 5G core 208 performs various core functions of the 5G network. In implementations, 5G core 208 can include an O-RAN core implementing various 5G services. Individual components may communicate on a bus, thus allowing various components of 5G core 208 to communicate with each other directly. Implementations 5G core 208 can involve additional other components.

Network resource management components can include Network Repository Function (NRF) and Network Slice Selection Function (NSSF). NRF can allow 5G network functions (NFs) to register and discover each other via a standards-based application programming interface (API). NSSF can be used by AMF to assist with the selection of a network slice that will serve a particular UE.

Policy management components can include Charging Function (CHF) and Policy Control Function (PCF). CHF allows charging services to be offered to authorized network functions. A converged online and offline charging can be supported. PCF allows for policy control functions and the related 5G signaling interfaces to be supported.

Subscriber management components can include Unified Data Management (UDM) and Authentication Server Function (AUSF). UDM can allow for generation of authentication vectors, user identification handling, NF registration management, and retrieval of UE individual subscription data for slice selection. AUSF performs authentication with UE.

Packet control components can include Access and Mobility Management Function (AMF) and Session Management Function (SMF). AMF can receive connection and session related information from UE and is responsible for handling connection and mobility management tasks. SMF is responsible for interacting with the decoupled data plane, creating updating and removing Protocol Data Unit (PDU) sessions, and managing session context with the User Plane Function (UPF).

In one O-RAN implementation, DUs, CUs, and/or any other components in that O-RAN, is implemented virtually as software being executed by general-purpose computing equipment, such as those in one or more data centers. Therefore, depending on needs, the functionality of a DU, CU, and/or 5G 208 core may be implemented locally to each other and/or specific functions of any given component can be performed by physically separated server systems (e.g., at different server farms). In some embodiments, DUs may be partially or fully added to cloud-based cellular network components. Such cloud-based cellular network components may be executed as specialized software executed by underlying general-purpose computer servers. Cloud-based cellular network components may be executed on a third-party cloud-based computing platform. For instance, a separate entity that provides a cloud-based computing platform may have the ability to devote additional hardware resources to cloud-based cellular network components or implement additional instances of such components when requested.

In implementations, Kubernetes (K8S), or some other container orchestration platform, can be used to create and destroy the logical DU, CU, 5G core units and subunits as needed for the O-RAN to function properly. Kubernetes allows for container deployment, scaling, and management. As an example, if cellular traffic increases substantially in a region, an additional logical DU or components of a DU may be deployed in a data center near where the traffic is occurring without any new hardware being deployed. (Rather, processing and storage capabilities of the data center would be devoted to the needed functions.) When the need for the logical DU or subcomponents of the DU is no longer needed, Kubernetes can allow for removal of the logical DU. Kubernetes can also be used to control the flow of data (e.g., messages) and inject a flow of data to various components. This arrangement can allow for the modification of nominal behavior of various layers.

In implementations, the deployment, scaling, and management of such virtualized components can be managed by the ZTPO (e.g, using Kubernetes) in the 5G core 208. The ZTPO can trigger various software processes executed by underlying computer hardware. In implementations, the one or more management functions (managing the 5G core 208, and/or the example system architecture 200 in general) can be implemented in the 5G core 208, for example through a M-Plane. The M-Plane can be configured to facilitate monitoring of O-RAN and determining the amount and location at which cellular network functions should be deployed to meet or attempt to meet service level agreements (SLAs) across slices of the cellular network.

In various implementations, the ZTPO can allow for the instantiation of new cloud-based components of the example system architecture 200 of the 5G O-RAN. As an example, to instantiate a new DU, the ZTPO can perform a pipeline of calling the DU code from a software repository incorporated as part of, or separate from, cellular network 120; pulling corresponding configuration files (e.g., helm charts); creating Kubernetes nodes/pods; loading DU containers; configuring the DU; and activating other support functions (e.g., Prometheus, instances/connections to test tools).

In some implementations, a network slice functions as a virtual network operating on example system architecture 200 of the 5G O-RAN. In those implementations, example system architecture 200 of the 5G O-RAN is shared with some number of other network slices, such as hundreds or thousands of network slices. Communication bandwidth and computing resources of the underlying physical network can be reserved for individual network slices, thus allowing the individual network slices to reliably meet particular SLA levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at a given RU and a given DU, a second set of network slices, which may only partially overlap or may be wholly different than the first set, may be reserved at the given RU and the given DU.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

In some embodiments, the 5G core 208 implements a O-RAN ZTP (zero touch provisioning) layer. In general, in those embodiments, the O-RAN ZTP layer is configured to facilitate automation of the deployment workflow within the example system architecture 200 of the 5G O-RAN. As will be described in more detail below, in some embodiments, a ZTP orchestrator, such as ZTPO 302 or ZTPO 504, is used to perform ZTP operations and other operations to facilitate the automation using the O-RAN ZTP layer. ZTP is commonly known as automated deployment of software, and/or various components in a system with as little human intervention as possible. I. Generally, ZTP is focused around new DU deployments, however BIOS setting update may be part of ZTP. In the context of example system architecture 200 of the 5G O-RAN, ZTP means automated deployment of software (new or updates) to hardware and/or software components such as CSRs, DUs, CUs, and various modules in the 5G core 208 with little human intervention. For example, without an engineer having to be present at a specific cell site such as 202*a* or 202*b*, O-RAN ZTP can facilitate automatic deployment of a DU with the latest DU software. It should be understood the O-RAN ZTP layer is referred to a set of components that work together to facilitate automatic deployment of software in the example system architecture 200 of the 5G O-RAN with little human intervention. Thus, although, the O-RAN ZTP layer is shown being implemented in the 5G core 208 in FIG. 2, it is merely illustrative. That is, the O-RAN ZTP in accordance with the present disclosure is not intended to be limited to components implemented a core of the O-RAN in accordance with the present disclosure. In some other examples, one or more components of the O-RAN ZTP can be implemented in, for example, CUs or DUs in the O-RAN in accordance with the present disclosure. For instance, as will be described below, adaptors configured to communicate with devices or components of different vendors for ZTP operations can be implemented in CUs or DUs.

Also shown in FIG. 2 is a NOC 210 (Network Operation Center). In some embodiments, the NOC 210 is implemented on a general-purpose computing device. In those embodiments, one or more interfaces are implemented in the NOC 210. In those embodiments, the interfaces can be used to manual trigger and implementation monitoring automatic deployment of software to various components in the example system architecture 200 of the 5G O-RAN. For instance, an interface is provided in the NOC 210 to enable an operator to set a schedule to update one or more network services in the 5G core 208. As another illustration, an interface is provided in the NOC 210 to enable the operator to push software to a specific component in a cell site (such as 202*a* or 202*b*) or in a data center to configure or update the component. One or more requests can be generated by the NOC 210 to instigate the deployment of the software as scheduled or intended by the operator. The request(s) can be received by the O-RAN ZTP layer, which in turn can generate one or more commands to deploy the software to the component. Although one NOC 210 is shown in this example, this is not intended to be limiting. More than one NOCs are typically deployed in the example system architecture 200 of the 5G O-RAN. In some implementations, a given NOC may be provided by a vendor to the 5G O-RAN. For instance, the vendor may be a software develop that provides components or services to the example system architecture 200 of a 5G O-RAN. In that instance, the given NOC is a computing device or system on a premise of the software developer.

Components such as DUs, CUs, the ZTPO, interfaces in the NOC 210, and/or any other components in the 5G core 208 may include various software components communicating with each other, handling large volumes of data traffic, and be able to properly respond to changes in the network. In order to ensure not only the functionality and interoperability of such components, but also the ability to respond to changing network conditions and the ability to meet or perform above vendor specifications, significant testing must be performed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Example ZTP Orchestration System

Figure 3:
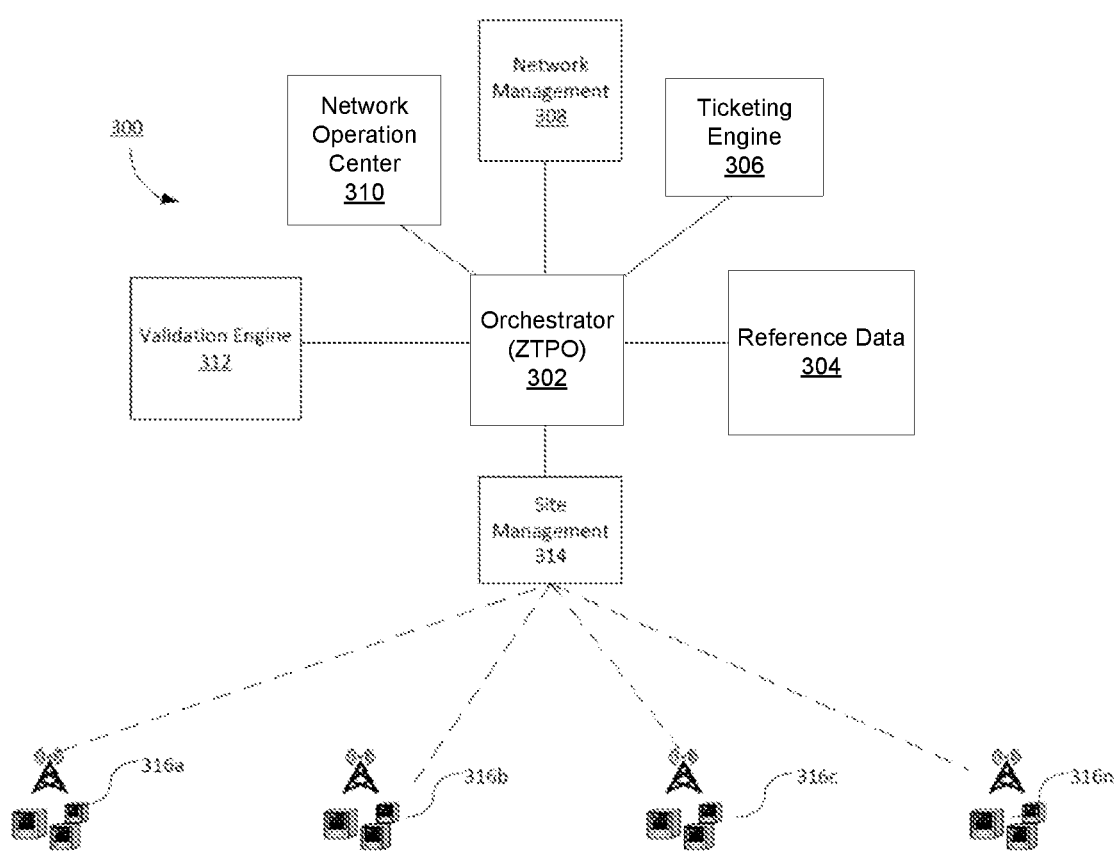
FIG. 3 illustrates an example system 300 that uses a ZTPO to facilitate ZTP workflows and operations within a telecommunication network in accordance with the present disclosure.

FIG. 3 illustrates an example system 300 that uses a ZTPO to facilitate ZTP workflows and operations within a telecommunication network, such as the one shown in FIG. 1 or FIG. 2, in accordance with some embodiments. In the illustrated example of FIG. 3, the system 300 includes a site management/monitoring component 314, a reference data component 304, a ZTPO 302, a ticketing component 306 designed to sends logs/point to the logs location to external ticketing system which in response will create a ticket, a network management component 308, a network operation center 310, a validation engine 312, and/or any other components (not shown). As also shown, the various components in the example system 300 are operable to communicate with individual cell sites 316*a*, 316*b*, 316*c*, 316*n*.

The ZTPO 302 is configured to facilitate orchestration of ZTP operations and workflows in the O-RAN. As used herein, a ZTP operation may be referred to as an operation configured to facilitate one or more operations illustrated and described herein. In various embodiments, ZTPO 302 acts as an engine in the O-RAN ZTP layer to kick off ZTP operations and workflows, monitor progress of the pipelines, generate tickets based on the operations, and the like. As shown, ZTPO 302 is configured to generate a specific request to obtain reference data associated with one or more ZTP operations. The reference data obtained by the ZTP orchestrator 302 can include one or more Customer Information Questionnaire (CIQs) (e.g., build/design specifications) managed by the reference data system 304 based on design standards/specifications database (SDB) contents. The reference data obtained by the ZTP orchestrator 302 can include information one or more actual inventory items and/or actual build-out information for a particular cell site. The reference data obtained by the ZTP orchestrator 302 can also include information regarding an updated network topology of the O-RAN. In various implementations, the ZTPO 302 can be configured to validate reference data obtained and determine inconsistencies within the reference data. In those implementations, the ZTPO 302 is configured to delay the ZTP operations until the inconsistencies are resolved. In some configurations the ZTPO 302 is configured to generate ZTP payload to carry out one or more ZTP operations. The ZTP payload can include instructions or actual software for configuring/provisioning/updating components in the O-RAN.

In various embodiments, the site management component 314 is configured to manage hardware and/or software deployed at each individual cell site, for example 316a, 316b, 316c, 316n. In some embodiments, the site management component 314 is configured to configure hardware on individual cell sites according to instructions provided to the site management component 314. In some embodiments, the site management component 314 is configured to boot strap network devices, upgrade network operating system (NOS), and configure VLANS across the individual cell sites. In some embodiments, the site management component 314 is configured to connect servers or hosts via selected network topology across the individual cell sites. In some embodiments, the site management component 314 is configured to deploy virtual infrastructure management (VIM) into a workload-ready state. In some embodiments, the site management component 314 comprises a bare metal orchestrator (BMO) provided by Dell.

In various embodiments, the site management component 314 is configured to manage and/or distribute workloads and/or data to individual cell sites. In some embodiments, the site management component 314 is configured to onboard, view, and manage a virtual infrastructure across the individual cell sites. In some embodiments, the site management component 314 comprises Telco Cloud Automation (TCA) orchestrator provided by VMWare.

In various embodiments, the reference data component 304 is configured to facilitate dynamic network inventory for one or more networks provided by the individual cell sites. In some embodiments, the reference data component 304 provides a comprehensive, end-to-end view of the resources to plan the deployment of new infrastructure for the individual cell sites and as well as to manage capacity. This facilitates delivering dynamic services like 5G, including network slicing. In some embodiments, the reference data component 304 is configured to provide a unified, dynamic view of hybrid resources and services across multiple domains to streamline operations and reduce complexity. In some examples, auto-discovery technique and federation capabilities using graph database technology can be used to model and visualize complex, dynamic networks, enabling automated workflows, such as the ZTPO workflows. In some embodiments, the reference data component 304 comprises a Blue Planet Inventory (BPI) system provided by Blueplanet.

In various embodiments, the ZTPO 302 is configured to facilitate ZTP operations and workflows to be carried out across the cell sites and/or on a core network. The workflows may involve automating one or more jobs to set up and/or verify one or more components on the core network to be ready for deploying network functionalities on the core network. As an example, the workflows may involve setting up one or more servers on the core network and/or in the individual cell sites for cell site deployment. The workflows may involve pushing software to update one or more components in the cell sites, and/or any other operations. In various embodiments, the ZTPO 302 comprises a Cisco Business Process Automation Service (BPA). According to different embodiments, the ZTPO 302 is configured to interact with components such as but not limited to Cisco® Network Services Orchestrator (NSO), Dell® Bare Metal Orchestrator (BMO), VMware® Telco Cloud Automation (TCA), element management systems (EMS), and the like.

In various embodiments, the ZTPO 302 is configured to manage and trigger workflows. The workflow management by the ZTPO 302 may involve managing workflows for configuring one or more servers on the core network, one or more distributed units (DU) in the core network, one or more radio access network (RAN) in the individual cell sites, one or more virtual clusters in the core network, one or more network functions in the core network, and/or any other workflows. More details are provided below.

In various embodiments, the network management component 308 is configured to manage one or more network components and/or devices on a core network. The network management may involve managing and identifying devices connected to the core network—for example, for the Domain Name System (DNS), Dynamic Host Configuration Protocol (DHCP), IP address management (collectively, "DDI"), and/or any other services. The network management component 308 may involve reserving and/or assigning one or more internet/intranet addresses for one or more components in the core network and/or individual cell sites. In various embodiments, the network management component comprises a system provided by Infoblox.

In various embodiments, the network operation center (NOC) 310 includes a user interface that is provided to facilitate a user to monitor a progress of the ZTP operations facilitated by the ZTPO 302, verify one or more results of the workflows, check one or more statuses of individual cell sites, check a status of a network function on the core network, and/or any other services. In various embodiments, the NOC 310 includes a graphical user interface (GUI) depicting a success/failure of a ZTP operation or workflow carried out to an individual cell sites, and/or whether or there is an issue with the ZTP operation and/or the workflow.

The validation engine 312 is configured to perform one or more validation tasks for the ZTP operations facilitated by the workflow engine 302. The validation may involve format validation in reference to reference data 304, validating whether one or more DU/RAN are deployable before their deployment and/or whether they are ready after their deployment.

The ticketing engine 306 is configured to perform ticketing operations related to the O-RAN network. For example, the ticketing engine may automatically create a ticket based on an incident occurring in the network and/or during execution of a workflow. Generally, a ticketing engine 306 allows authorized personnel to track, manage, speed up, and deal effectively with incidents. In some examples, the ticketing engine 306 can automatically distribute and assign incidents to the appropriate personnel. According to some configurations, the ticketing engine 306 can also automatically carry out simple tasks to save time and resources.

The communication between the ZTPO 302 and the validation engine 312, for example, can facilitate validation of the ZTP operations carried in a workflow. Such validation may include pre-stage validation and/or post-stage workflow. A pre-stage workflow typically involves checking various aspects of the core network and/or individual cell sites to ensure a particular stage (for example CHP, VCP, NPC, etc) can be performed in the ZTP workflow. A post-stage workflow typically involves checking whether ZTP operations for a particular stage is completed successfully.

The communication between the ZTPO 302 and the site management component 314 can facilitate ZTP operations for individual cell sites. For example, as will be described later in detail, this communication can facilitate ZTP operations for the VCP stage. The communication between the workflow engine 302 and the reference data component 304 can facilitate ZTP operations in various stages where inventory information is needed. For example, in the RAN stage, such information may be needed to ensure individual cell sites provide the correct physical and/or virtual infrastructure for a particular RAN. The communication between the ZTPO 302 and the network management component 308 can facilitate ZTP operations in various stages where network management (such as IP address assignment or reservation) is needed.

Figure 4A:
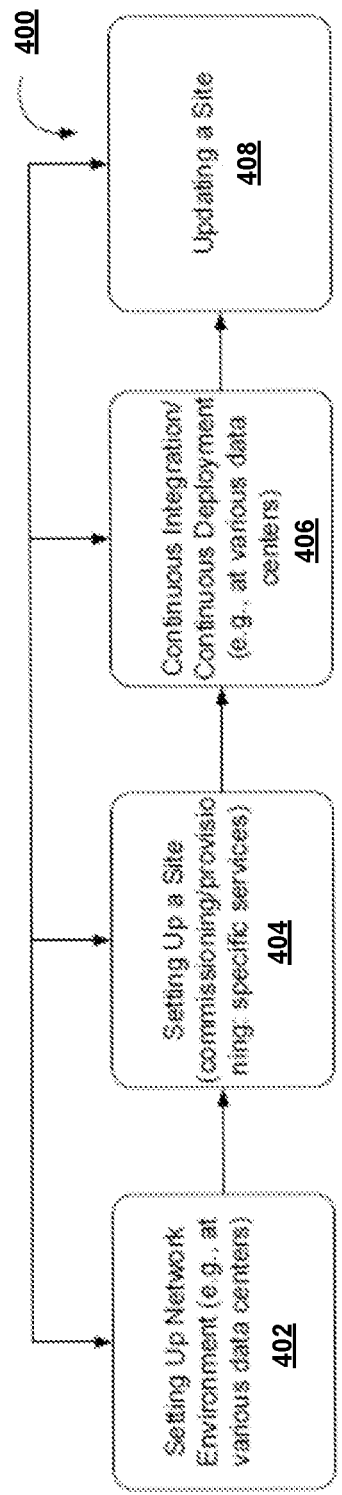
FIG. 4A illustrates an example process for setting up, provisioning, and operating a O-RAN in accordance with the present disclosure.

FIG. 4A illustrates an example process 400 for setting up, provisioning, and operating a O-RAN such as the example system architecture 200 of the 5G O-RAN shown in FIG. 2. In the process 400, O-RAN ZTP technologies are employed to facilitate each step in the process 400. According to some configurations, a ZTPO such as ZTPO 302/504 manages different ZTP pipelines. The example process 400 is shown to help understand how the O-RAN ZTP technologies in accordance with the present disclosure helps running of an O-RAN in accordance with the present disclosure. It should be understood the steps shown in FIG. 4A, while sequential, is not intended to be limited to the specific sequence shown in FIG. 4A. In some other examples, relevant sequences for the process 400 may be different from that shown in FIG. 4A.

In some examples, the ZTPO can use various ZTP technologies in an O-RAN to 1) install/update network hardware components (such as RUs) in cell sites, 2) install/update network functionality components (such as DUs, CUs, orchestrator, and/or any other networking components in the O-RAN) in data centers, and/or any other operations without someone needing to configure those components locally where they are located. For example, a new or replacement device can be sent to a cell site, physically installed and powered up by a locally present employee, who is not required to have IT skills. This is when the ZTPO can use ZTP technologies to automatically carry out the software installation, updates, the configuration of the device, and connect the device to the O-RAN.

In the example process 400 for setting up, provisioning, and operating an O-RAN in accordance with the present disclosure, at electronic processor 402, a network environment is typically set up. At 402, operations such as setting up various network function components (for example, those mentioned above) in one or more data centers is performed to facilitate the operation of the O-RAN. For example, this may involve implementing network function components according to one or more design specifications for the O-RAN, pre-CSR integration of the various network function components, emulating DUs for the O-RAN for setting up the network environment using the various network function components, implementing one or more transport tools, and/or any other operations. During this stage, a ZTP layer can be implemented, for example such as the O-RAN ZTP layer shown in FIG. 2.

At 404, a cell site can be set up in the network environment set up at 402. For example, in the 5G context shown in FIG. 2, this may involve installing one or more RUs in the cell site, laying cables in the cell site, configurating a CSR for a cell site, making connections from the RUs to the CSR, making connections from the cell site to a core network in the network environment, making connections between the cell site an LDC (CRAN), or BEDC (DRAN) and/or any other operations. During this stage, functions or services can be automatically provisioned or commissioned on various components. For instance, after an RU device is installed in the cell site (such as cell site 202a or 202b shown in FIG. 2) and powered up for the first time, a communication address can be automatically assigned to the RU device. Then, the O-RAN ZTP layer can automatically configure the RU device through the communication address assigned to the RU device. In some examples, an RU is built by pulling configuration for EMS or combination of EMS and DU (subject to vendor implementation. As another example, a CSR implemented in the cell site can be automatically integrated into the network environment according to a network specification configured with the O-RAN ZTP layer after the CSR is ready to function in the network environment.

At 406, continuous integration and continuous deployment (CI/CD) of various network function components are carried out in the network environment set up at 402. CI/CD is a set of practices that enable how software, in this case, O-RAN software, is installed and updated. CI or Continuous Integration is the practice of merging all developers working code to a shared mainline several times at a frequency. Every merge is typically validated before merging to uncover any issues. CD or Continuous Delivery/Deployment is the practice in which software developers produce reliable software in short cycles that can be released (delivered) at any time, which can then be deployed at a frequency. As a result, any software can be released much faster, more frequently and reliably into O-RAN. The benefit of CD is more predictable deployments that can happen on demand without waiting for an "official" upgrade cycle—this is now thing of the past.

Examples of CI/CD at 406 can include infrastructure deployment or update including the following components: networking stack, computing stack, storage stack, monitoring stack, security stack, core network functions. In some embodiments, the CI/CD at 406 can include Cloud-Native Network Functions (CNF) deployment and update. For instance, a CNF is deployed onto one or more CUs using control tools. In some embodiments, the CI/CD at 406 can include deploying a specific application or tool for a specific CNF. In some embodiments, changes to various network function components are deployed in the network environment continuously. In implementations, a ZTP pipeline/workflow is used to facilitate the aforementioned CI/CD operations. In some configurations, the ZTP pipeline/workflow is deployed within the O-RAN ZTP layer shown in FIG. 2. In that implementation, the ZTP pipeline defines various stages through which software code is retrieved from a source code repository, is built into corresponding artifacts (e.g., micro-services, network functions), is tested using predefine tests, and is deployed in the network environment after successful results of the testing.

At 408, a cell site is updated, for example, with latest software or configuration. This may be triggered at a preset frequency configured at the ZTP layer in the network environment. For instance, a cadence such as every week may be set to update software deployed on the components in the cell site, such as RUs, DUs, CSRs, and/or any other components. However, this is not necessarily the only case. Operations at 408 can also involve configuring or provisioning devices or components newly installed in the cell site—e.g., replacement or new devices. Similar to operations at 404, in such situations, software can be pushed to the newly installed devices or components by the ZTP layer once they are live in the network environment.

In implementations, operations involved in 404 may be referred to as "day 0" operations. Operations involved in 402 may be referred to as "day 1" operations. Operations involved in 406 may be referred to as "day 2" operations. Operations involved in 408 may be referred to as "day 3" operations. The numerical references in these operations do not necessarily indicate that these operations have to happen in a time sequence. As shown in FIG. 4A, operations in the example process 400 can happen in any sequence. For example, after a day "0" operation in 404 happens, the process 400 can proceed to 402 to push a specific configuration that involves components in the "day 0" operation to a core (such as the 5G core 208 shown in FIG. 2), and then proceed to 408 to update another cell site (e.g., to configure that cell site to be connected to the cell site set up in the day 0 operation). Other scenarios are contemplated. According to some examples, the ZTPO 302 can orchestrate deployment of cell cites in parallel. For instance, the ZTPO 302 may coordinate the ZTPO workflows for the deployment of two, three, ten, a hundred cell sites, and the like at the same time.

Figure 4B:
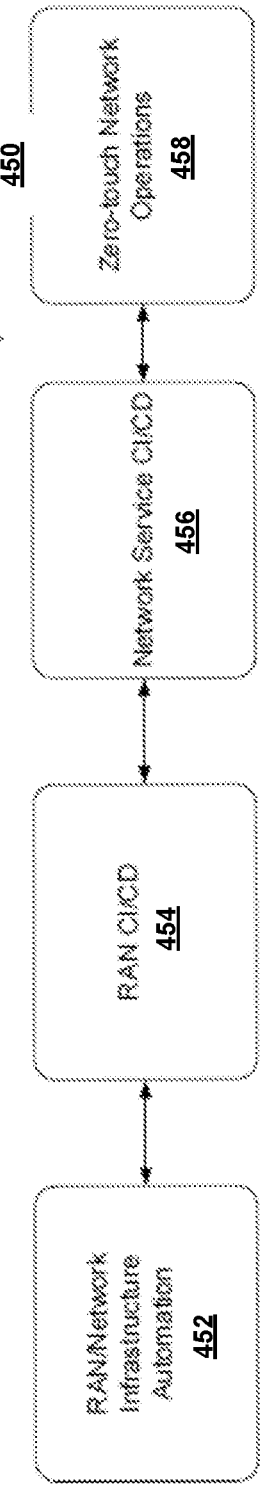
FIG. 4B illustrates another example process showing how ZTP is facilitated in an O-RAN in accordance with the present disclosure.

FIG. 4B illustrates another example process 450 showing an example of how ZTP and CI/CD are facilitated in an O-RAN in accordance with the present disclosure. Process 450 illustrates the ZTP and CI/CD in the O-RAN in accordance with the present disclosure from a perspective of O-RAN operation cycles.

At 452, an activity or operation at a cell site triggers an automation in the ZTP layer of the O-RAN. For example, this may involve a replacement of a RU device in the cell site is brought online by a personnel present at the cell site. Once the RU device is online, the RU device may generate a request for software update, e.g., security patch, and configuration of the RU device, and such a request may be received by the ZTPO in the ZTP layer in the O-RAN. In some embodiments, the ZTPO in the ZTP layer may be configured to monitor activities across cell sites in the network environment and the automation is triggered by the ZTPO once the replacement RU device is detected to be online.

At 454, lower-level network (e.g., radio network or RAN) CI/CD can be carried out. In some situations, the operations in 454 are triggered by one or more activities at 452. For example, as illustration, after the replacement RU device is brought online and configured by the ZTPO, one or more components in a CSR, DU, CU, and or reference data 304, is to be configured to record the replacement RU device. In that example, the ZTP layer in the O-RAN can trigger such a configuration so the lower-level network is updated to incorporate the replacement RU into the O-RAN. In some situations, the lower-level network CI/CD at 454 is independent of the activities at cell sites. For instance, the software developers for particular types of CSR, DU or CU can set a CI/CD pipeline and schedule deployment of their latest software on the CSR, DU or CU at a preset frequency (e.g., nightly or weekly).

At 456, network service CI/CD is performed. In some situations, the CI/CD operations in 456 are triggered by one or more operations or changes in at 454. For example, as illustration, after software is deployed at the lower network level at 454, one or more network services are updated based on the deployment of the software. For instance, without limitation, in the context of 5G, various 5G network services can be updated after the underlying RAN in the 5G O-RAN are updated. In some situations, the CI/CD operations in 456 are independent of operations or changes at 454. For example, software developers of the core network services for the 5G O-RAN can set up a schedule to release their software to update the core network services on a regular basis.

At 458, operations control the ZTP in the O-RAN are performed. Examples of these operations can include scheduling release of software to O-RAN components, instantiating a DU or CU, configuring an RU or CSR in a cell site, and/or any other operations. In some examples, the operations at 458 are performed using a NOC such as the NOC 210 shown in FIG. 2. It should be understood although process 450 is illustrated so far from 452 to 458 in sequence, this is not intended to limit the O-RAN ZTP technologies in accordance with the present disclosure to a bottom up or top-down approach. In various embodiments, a ZTP request is configured for instigating one or more ZTP operations in the O-RAN. In some situations, ZTP can be carried out by a third-party vendor to update its components in the O-RAN in a mixture of bottom-up and top-down approach. For instance, the third-party vendor may ship a router device to a cell site, which is installed by a technician on the cell site. Once the router device is live, it generates its status information to a management server of the third-party vendor for configuration of the router. In that example, the third-party vendor dynamically configures the router according to specifications or requirements of the O-RAN where the router is installed. In this way, a mixture of bottom-up and top-down ZTP is used to configure the router.

Figure 5:
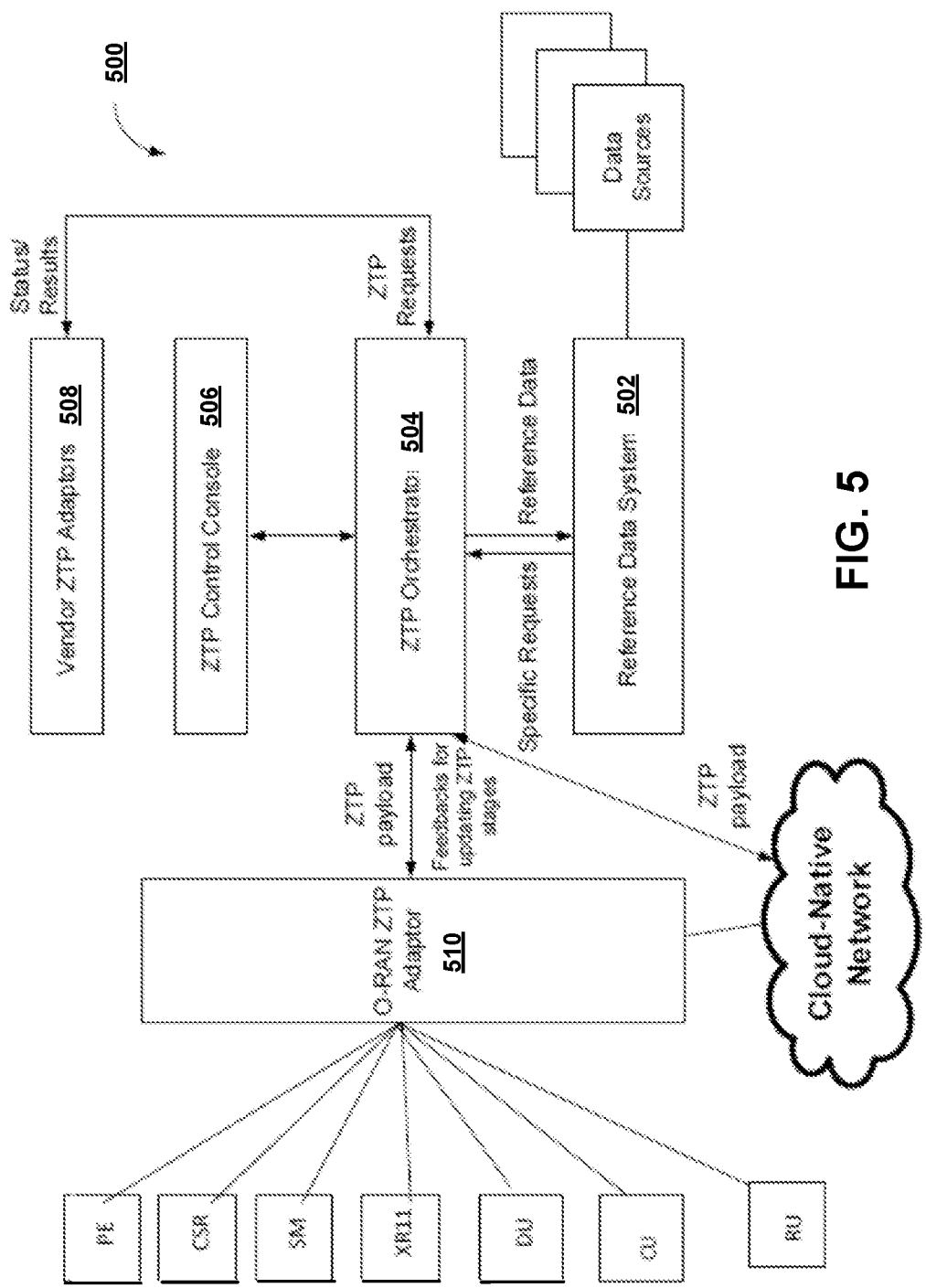
FIG. 5 an example O-RAN ZTP layer in accordance with the present disclosure.

With example processes of how ZTP technologies and a ZTPO can be used in an O-RAN in accordance with the present disclosure having been generally described and illustrated in FIGS. 4A-4B, attention is now directed to FIG. 5, where an example O-RAN ZTP layer 500 that includes a ZTPO 504 is shown.

As shown, in this example, the O-RAN ZTP layer 500 includes a reference data system 502, a ZTPO 504, a ZTP control console 506, vendor ZTP adaptors 508, O-RAN ZTP adaptor 510, and/or any other components. In various implementations, the O-RAN ZTP layer 500 can achieve various functions and objectives described in connection with and illustrated in FIG. 4A and FIG. 4B.

In this example, the reference data system 502 is configured to receive and/or obtain data from one or more data sources, validate the data, establish one or more reference data models for the O-RAN, manage the reference data including the reference data models, and/or any other operations. One insight in accordance with the present disclosure is that reference data may be used to adjust/adapt ZTP operations in an O-RAN in accordance with the present disclosure. In general, an O-RAN can have data such as network specifications, design blueprints, and data provided by vendor(s)/operator(s)/developer(s) such as specifications of hardware components and/or software components installed in the O-RAN to facilitate operations of the O-RAN. Such data may be referred to as design data, or priori-provided data, which is typically used and/or recorded at 402 or 404 shown in FIG. 4A. This design data can be used as reference data to drive ZTP operations in the O-RAN, such as those described and illustrated in FIGS. 4A-4B. For example, as illustration, without limitation, design data regarding network topology (network topology data) in the O-RAN can be stored in a database and used to facilitate ZTP operations that push software updates to various components as indicated by the network topology data.

However, another insight data in accordance with the present disclosure is that sole reliance on design data mentioned above for facilitating ZTP operations is not robust at least because mistakes/errors can typically happen during implementations of the O-RAN. For instance, when setting up a cell site (such as 202a or 202b shown in FIG. 2), mistakes such as wrong wiring or wrong components can be introduced to the cell site. Such mistakes can cause inconsistencies between the design data and the actual implementation of the O-RAN. In the instance described above, the design data can indicate a component is installed in the cell site while that component is not actually installed in the cell site. As can be seen, sole reliance on the design data to facilitate ZTP operations would not be adequate and can lead to failures of the ZTP operations, such as those described and illustrated in FIGS. 4A-4B. The robustness and reliability of the ZTP operations in the sole reliance of design data model would then depend on qualities of the implementations of the O-RAN. In principle, an automatic system, such as the O-RAN ZTP, may not have a likelihood of failures without an ability to adjust/adapt itself in anticipation of inconsistencies between design data and actual implementation of the O-RAN.

Still another insight in accordance with the present disclosure is that data regarding actual implementation of the O-RAN can be captured and stored during, for example, 402 or 404 shown in FIG. 4A. For instance, during setting up a cell site, field technician can be equipped with tools, such as a scanner or a smartphone, to capture information indicating actual wiring and/or connections between components set up in the cell site, actual components installed in the cell site and/or any other type of information. Such data may be referred to as implementation data, which can be stored and compared with design data. Validation intelligence can then be configured into the O-RAN ZTP layer 500 and ZTPO 504 to adjust/adapt itself. For instance, if component 1 is installed in a slot indicated as component 2 in the design data, and component 1 and component 2 are of the same model (e.g., a physical server provided a same vendor), the actual reference data for the ZTP operations used by the O-RAN ZTP layer 500 can be adjusted to show component 1 is now component 2 and configure it accordingly (for example installing a version of DU on t server designated as component 2) instead of still treating it as component 1. In this fashion, inconsistencies between design data and implementation data are resolved. Another example is that inconsistency found between design and implementation data for a particular component can be reported for human attention and ZTP operations are instigated on that component only after the inconsistency is resolved.

In considerations of the various insights mentioned above, in some implementations, O-RAN ZTP layer 500 is facilitated through network/cell site modeling based on data from various data sources. For example, knowledge of how cell sites in the O-RAN are actually constructed, and actual inventory in the cell sites can be obtained to establish data models about the cell sites. Using such knowledge, the O-RAN ZTP layer 500 can deploy software to components as constructed in the cell sites. For instance, vendor information model numbers, OS versions, specific connections made to a CSR, and/or any other information about an RU can be obtained during construction of a cell site and stored in the reference data system 502. As another example, network topology of the O-RAN can be updated as cell sites come and go in the O-RAN throughout a life cycle of the O-RAN. In that example, the updated network topology can be stored in the reference data system 502.

Figure 6:
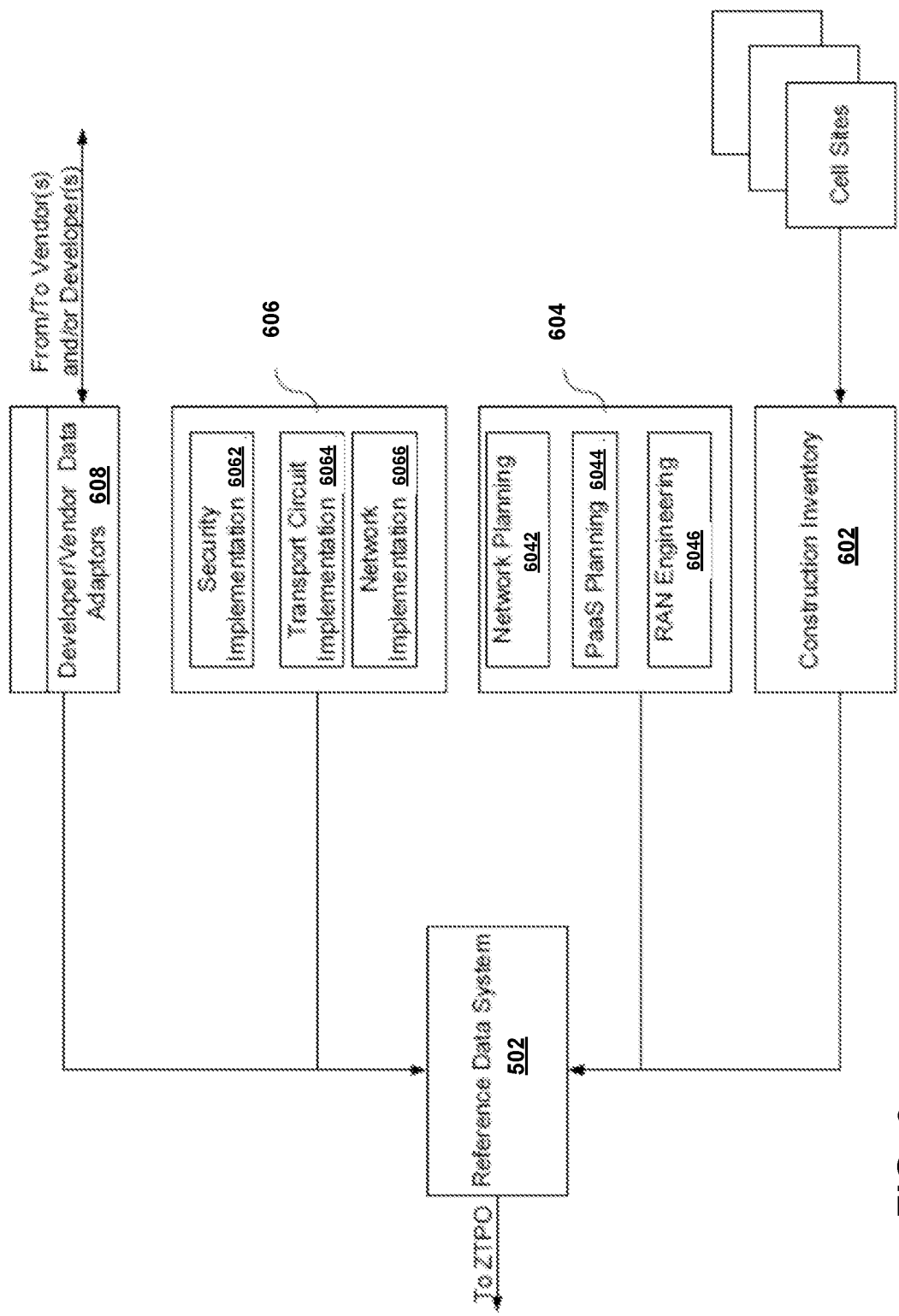
FIG. 6 illustrates an example of various data sources that provide reference data regarding the O-RAN in accordance with one embodiment.

FIG. 6 illustrates an example of various data sources that provide reference data regarding the O-RAN in accordance with one embodiment. In various embodiments, one or more data sources shown in FIG. 6 can be part of the O-RAN ZTP layer 500. In some embodiments, one or more data sources shown in FIG. 6 can be provided one or more vendors of the O-RAN. In those embodiments, these data sources communicate with the reference data system 502 through interfaces between systems of the vendors.

As shown in this example, one type of data source (e.g., implementation data) is construction inventory 502 shown in FIG. 5. As mentioned, during construction of cell sites, inventory information regarding the cell sites can be obtained and stored in the construction inventory 602. For example, as illustration, during construction of a cell site, components information regarding components actually installed in the cell site can be captured by a management or workflow system. For instance, as a field engineer completes installation of a particular component in the cell site, the field engineer typically records installation information for the component—for example, where it is located in the cell site, one or more connections made for the component, information regarding testing performed on the component, model information, vendor information, OS information, and/or any other component information. It should be understood that the installation information regarding the component can be different from inventory information indicating the component, for example, provided by a vendor of the component. For instance, devices actually installed in the cell site can be different from inventory/planning for the cell site. For instance, field engineers may install a different model of a device in the cell site than what is planned for the cell site. An insight provided by the present disclosure is that reference data used to facilitate O-RAN ZTP in accordance with the present disclosure cannot just rely on inventory information provided by operator(s) and/or vendor(s) of the O-RAN. Mistakes and/or inconsistencies often take place during construction of a cell site. As mentioned above, for instance, a wrong model of a device may be installed in the cell site. Thus, actual construction inventory—information regarding components actually installed in the cell site—is also obtained and stored for the O-RAN ZTP layer 500.

In some embodiments, the construction inventory 602 is implemented using a repository management system. Information regarding an actual built-out of a cell site is captured and managed by the repository management system. In those embodiments, one or more workflow procedures are performed by the field engineers when setting up a cell site, for example, in step 404 shown in FIG. 4B. For instance, according to the procedure(s), the field engineers input various installation information using their smartphones or dedicated devices. For illustration, the field engineers using their smartphones to capture an image of the backside of an installed router to show cables connected to which ports on the router. This image is then transmitted, by the smartphones, to the repository management system, which is configured to extract connection information from the image and store the connection information. As another illustration, the field engineers input data in fields for installation information regarding the installed router in an app of their smartphones. The app may be provided by a developer of the repository management system. The data input by the field engineers includes connection information regarding the installed router. The data is transmitted by the smartphones to the repository management system, which then stores the data. In one embodiment, without limitation, the construction inventory 502 is implemented using a NexSysOne (NX1) management system.

Another type of data source for the reference data system 502 is data for O-RAN design and planning (e.g., a type of design data), which is generally and collectively referred to as O-RAN design and planning data 604. Examples of O-RAN design and planning data 604 can include network planning data 6042, PaaS (Platform as a Service) planning data 6044, RAN engineering data 6046, and/or any other types of data. In some embodiments, the network planning data 6042 can include data for planning various regions, markets, data centers, and/or any other sections or entities in the O-RAN. In some embodiments, such data is available in a suite of planning tools used to design the O-RAN. In one implementation, the suite of planning tools are implemented using IP Address Management (IPAM).

In some embodiments, PaaS planning data 6044 include data for mapping data centers and compute stacks such as EKS (Elastic Kubernetes Service) clusters, data centers and storage stacks such as S3 (Simple Storage Service) buckets, EBS (Elastic Block Store) volumes and EFS (Elastic File System), data centers and monitoring stacks such as Cloud-Watch, data centers and security stacks such as VPC (Virtual Private Cloud) NACLs (Network Access Control List) and EC2 (Agile Scaling and Secure Service) security groups, and/or any other PaaS planning data. In some embodiments, the PaaS planning data 6044 includes data for mapping CU clusters to EKS cluster, TKG master cluster to Software Defined Data Center (SDDC), and/or any other types of PaaS planning data.

In some embodiments, the RAN engineering data 6046 includes data for RF planning including cell sites allocation within the O-RAN. In one implementation, the RF planning data is available in a tool called Planet, which is a RF software planning tool provided by Infovista. In some embodiments, the RAN engineering data 6046 includes data for DU, CU, TKG, EMS cluster mapping. In one implementation, the O-RAN design and planning data 604 is managed by a design specifications database (SDB). The SDB is configured to receive, obtain, store and manage network planning data 6042, PaaS planning data 6044, RAN engineering data 6046, and/or any other design-specific data. In that implementation, without limitation, the SDB is part of the O-RAN ZTP layer 500.

Still another data source for the reference data system 502 is referred to as O-RAN deployment data 606 (e.g., a type of implementation data). As shown, examples of the O-RAN deployment data 606 can include security implementation data 6062, transport circuit implementation data 6064, network implementation data 6066 and/or any other implementation data for RAN deployment. In some embodiments, the security implementation data 6062 can include data captured during or after implementation of secure boot environment for individual hardware devices in the O-RAN (for example, SM-PXE (preboot execution environment)), security modules for DNS, DHCP and Network address management (for example, Infoblox DDI (DNS, DHCP and IP address)), and/or any other securing implementation data for the O-RAN.

The transport circuit implementation data 6064 can include data captured during or after implementations of various sections of the transport layer (such as the transport layer 206 shown in FIG. 2) in the O-RAN. For example, after cables are laid to connect a section of the midhaul in the O-RAN, data can be input by the field engineer(s) to their smartphones, which in turn can transmit the implementation data for that section of the midhaul to a management system. The management system can store and manage such transport circuit implementation data 6064.

The network implementation data 6066 can include various implementation data indicating implementation (typically software) of network services/components/functions in the O-RAN. Examples of such data can include CU/EMS implementation and deployment over one or more hosting EKS clusters, SDDC (software defined data center) deployment in the O-RAN, CI/CD pipeline implementation in the O-RAN, RAN-EMS/EFS configuration, and/or any other network implementation data. In various implementations, the O-RAN deployment data 606 is received, obtained, stored, and/or managed by a repository management system for managing the aforementioned implementation data. In one implementation, such a repository management system is part of the O-RAN ZTP layer 500.

Yet another type of data source for the reference data system 502 is reference data provided by various developers or vendors of the O-RAN. Such data is referred to as developer/vendor reference data. As shown, in some embodiments, one or more developer/vendor adaptors 608 can be provided to facilitate data from a specific developer or vendor. For example, without limitation, one or more adaptors can be provided for Cisco provided components in the O-RAN so that Cisco can provide reference data about those components—for example, data indicating the latest build version, one or more software release notes, one or more bug fix logs, and/or any other relevant information. Typically, in an O-RAN, more than one developer or vendor is involved to develop and/or facilitate the running of the O-RAN. In one implementation, developer/vendor adaptors 608 are provided for various vendors and developers including VMWare, Cisco, Dell, Amazon Cloud Service, Mavenir, Samsung, and/or any other developers and/or vendors.

Attention is now directed back to FIG. 5. The ZTPO 504 is configured to facilitate orchestration of one or more ZTP operations in the O-RAN. As used herein, a ZTP operation may be referred to as an operation configured to facilitate one or more operations illustrated and described in association with FIGS. 4A-4B, as well as other operations that are associated with setting up a cell site. In various embodiments, ZTPO 504 acts as an engine in the O-RAN ZTP layer to kick off ZTP operations. As shown, the ZTPO 504 is configured to generate a specific request to the reference data system 502 to obtain reference data. The reference data obtained by the ZTPO 504 can include one or more CIQs (e.g., build/design specifications) managed by the reference data system 502 based on SDB contents. The reference data obtained by the ZTPO 504 can include information one or more actual inventory items and/or actual build-out information for a particular cell site managed by the reference data system 502. The reference data obtained by the ZTPO 504 can include information regarding an updated network topology of the O-RAN managed by the reference data system 502. In various implementations, the ZTPO 504 can be configured to validate reference data obtained and determine inconsistencies within the reference data. In those implementations, the ZTPO 504 is configured to delay the ZTP operations until the inconsistencies are resolved.

In various embodiments, as shown in this example, The ZTPO 504 is configured to manage ZTP operations associated with many different vendors. In some configurations, the ZTPO is configured to receive, through a vendor ZTP adaptor 508, a ZTP request from a developer or vendor of the O-RAN to instigate a ZTP operation, for example to install or release a latest version of software to a component provided by the developer or vendor in the O-RAN. As shown, in those embodiments, the ZTPO 504 can feedback a status or result of the requested ZTP operation to the developer or vendor via the vendor ZTP adaptor 508.

As shown, the ZTPO 504 is configured to generate ZTP payload to carry out one or more ZTP operations. The ZTP payload can include instructions or actual software for configuring/provisioning/updating components in the O-RAN. As shown, the ZTPO 504 can transmit the ZTP payload directly to a core network of the O-RAN such as the 5G core 208 shown in FIG. 2. In various embodiments, such as the one shown in this example, the ZTPO 504 can transmit the ZTP payload to O-RAN ZTP adaptor 510, which in turn can configure/provision/update various components (including the core network). Some example components (such as XR11 servers) are shown in this example, just to illustrate the components can include a variety of software and hardware components provided by difference vendors and developers, and thus not intended to be limiting.

As still shown, the ZTPO 504 can receive feedbacks from the core network and/or O-RAN ZTP adaptor 510. The ZTPO 504 can be configured to update one or more aspects of the ZTP operations according to the feedbacks. For example, as shown in this example, specific ZTP stages can be updated according to the feedbacks. According to some embodiments, the ZTPO 504 is also configured to generate one or more tickets based on the feedback. For example, the feedback may indicate that a ZTP operation did not complete successfully and/or some other specified condition occurred that warranted further review. In these cases, the ZTPO 504, and/or some other component or device such as the ticketing engine automatically generates and distributes one or more tickets.

Figure 7:
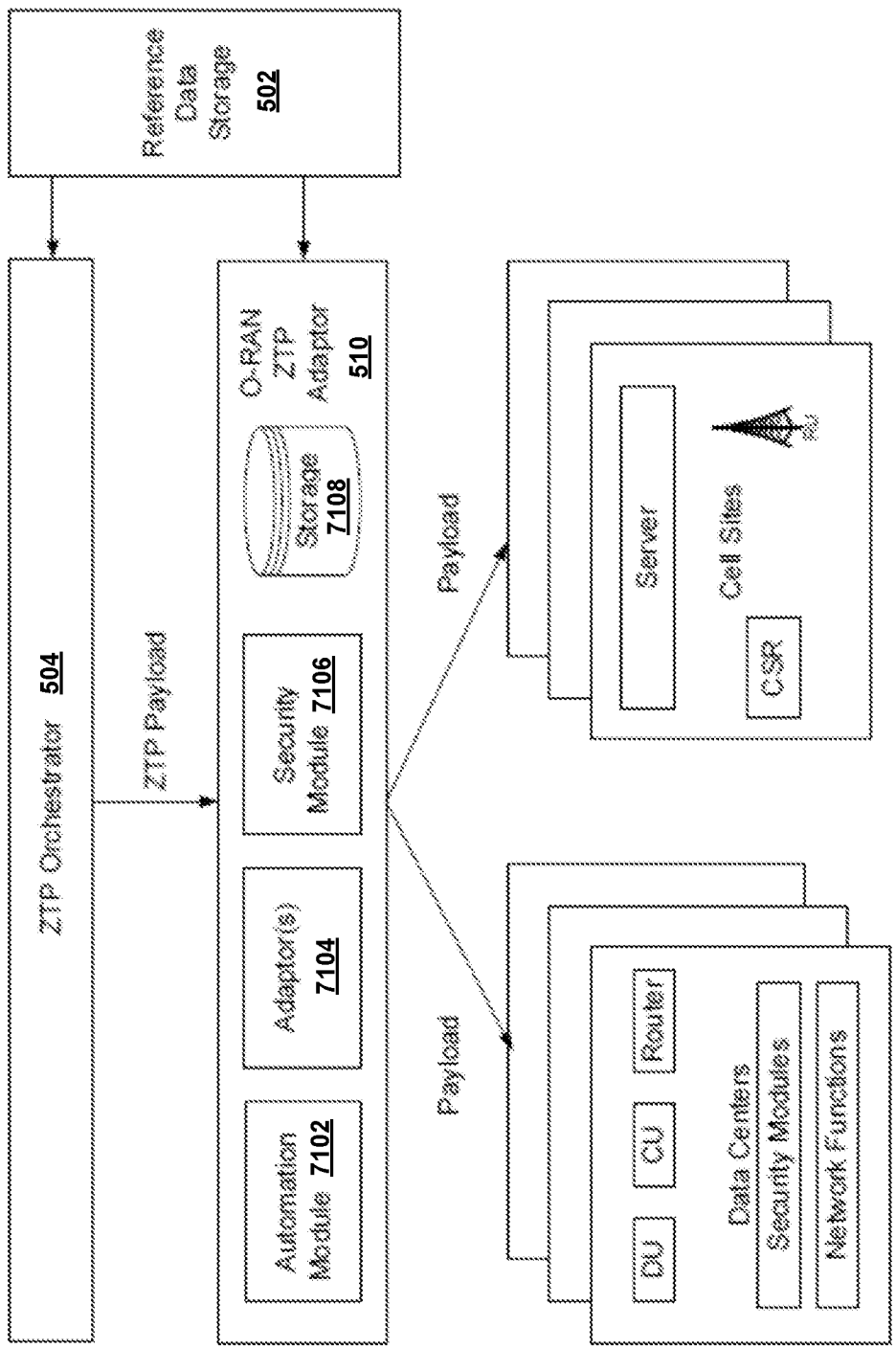
FIG. 7 illustrates one example of the O-RAN ZTP adaptor shown in FIG. 5.

FIG. 7 illustrates one example of the O-RAN ZTP adaptor 510 shown in FIG. 5. As mentioned, multiple developers or vendors can be involved in an O-RAN in accordance with the present disclosure. An insight provided by the present disclosure is that individual adaptors can be provided to facilitate ZTP operations on components in the O-RAN after they are orchestrated by the ZTPO 504. In this example, the O-RAN ZTP adaptor 510 includes an automation module 7102, one or more adaptors 7104, a security module 7106, a storage 7108, and/or any other components.

In some embodiments, the automation module 7102 is configured to carry one or more ZTP operations in accordance with one or more preconfigured rules or procedures. For instance, as illustration, without limitation, the ZTP payload received from the ZTPO 504 can include an instruction for a particular ZTP operation to be carried out—e.g., release a software update to a component in the O-RAN. In that instance, the automation module 7102 is configured to instantiate such an instruction by obtaining one or more rules or procedures corresponding to ZTP operations on that component. This may involve putting together an execution plan and/or a set of commands for carrying out the software update. Various components in the O-RAN can have different rules and/or procedures for ZTP operations on them. The automation module 7102 is configured to facilitate ZTP operations on the variety of the components in the O-RAN.

The adaptor(s) 7104 is configured to communicate with one or more components in the O-RAN. As shown, in FIG. 7, the components can include DUs, CUs, routers, security modules, network functions and/or any other components in one or more data centers in the O-RAN. The components can include a server (e.g., such as XR11 server provided by Dell), CSR, computing station (e.g., such as a site management system), RU and/or any other components in a cell site. In some embodiments, the O-RAN ZTP adaptor(s) 510 can include interface for a component provided by a vendor to communicate with another component in the O-RAN. For example, such an interface can include interface between Cisco Crosswork Network Controller (CNC)/NSO and one or more CSRs, Dell BMO and one or more XR11 servers, VMWare TCA/Gitlab and one or more XR11 servers, DUs and site management systems, AWS code Pipeline and CU, and/or any other interfaces.

The security module 7106 is configured to authenticate ZTP payload such as an instruction to instigate an ZTP operation is indeed from ZTPO 504 in the O-RAN. In various implementations, the security module 7106 is configured with security protocols to ensure secure communications with ZTPO 504, reference data system 502, data centers, cell sites and/or any other entities in the O-RAN.

The storage 7108 is configured to store one or more rules and/or procedures for facilitating ZTP operations on various components in the O-RAN. In implementations, data or artifacts stored in the storage 7108 can be used by the automation module 7102 and/or adaptor(s) 7104 to facilitate the ZTP operations.

Attention is redirected back to FIG. 5. The ZTP control console 506 is configured to provide one or more interfaces to enable one or more personnel of the O-RAN to perform and/or monitor ZTP operations. In one embodiment, a graphical dashboard is provided in the ZTP control console 506. In that embodiment, the dashboard provides an interface to enable personnel (for example, a network engineer, a support engineer, a service engineer) of an operator of the O-RAN to instigate one or more ZTP operations. The ZTP control console 506 can be configured to facilitate the personnel to generate a request to instigate the one or more ZTP operations in the O-RAN and transmit the request to the ZTPO 504 for execution.

The vendor ZTP adaptor 508 is configured to facilitate communications between systems/servers of vendor/developer of the O-RAN and the ZTPO 504. As mentioned, multiple vendors and/or developers can be involved in the O-RAN. The vendor ZTP adaptor 508 can be configured and placed in the O-RAN to enable these vendors or developers to instigate their ZTP operations on components provided by them in the O-RAN. For instance, the vendor ZTP adaptor 508 can be configured to communicate with a release management server of a specific vendor. The communication enabled by the vendor ZTP adaptor 508, in that instance, can include receiving a ZTP trigger from the specific vendor to release a version of its software to corresponding components provided by that vendor in the O-RAN.

FIGS. 8-15 illustrate examples of methods for orchestrating zero-touch provisioning of one or more components in an O-RAN in accordance with the present disclosure. The operations of methods 800-1500 presented below are intended to be illustrative. In some embodiments, methods 800-1500 may be accomplished with one or more additional operations not described and/or without one or more of the operations discussed. Additionally, the order in which the operations of methods 800-1500 are illustrated in FIGS. 8-15 and described below are not intended to be limiting.

In some embodiments, methods 800-1500 may be implemented by one or more computing devices including one or more of a processor. A given one of the one or more computing device may include a digital processor, an analog processor, a digital circuit designed to process information, an analog circuit designed to process information, a state machine, and/or other mechanisms for electronically processing information. The device may execute some or all of the operations of methods 800-1500 in response to instructions stored electronically on an electronic storage medium. The device may include one or more components configured through hardware, firmware, and/or software to be designed for execution of one or more of the operations of method 800. In various implementations, methods 800-1500 are carried out in a ZTP O-RAN layer by a ZTPO, such as the ZTPO 504 in the O-RAN ZTP layer 500 shown in FIG. 5.

Figure 8:
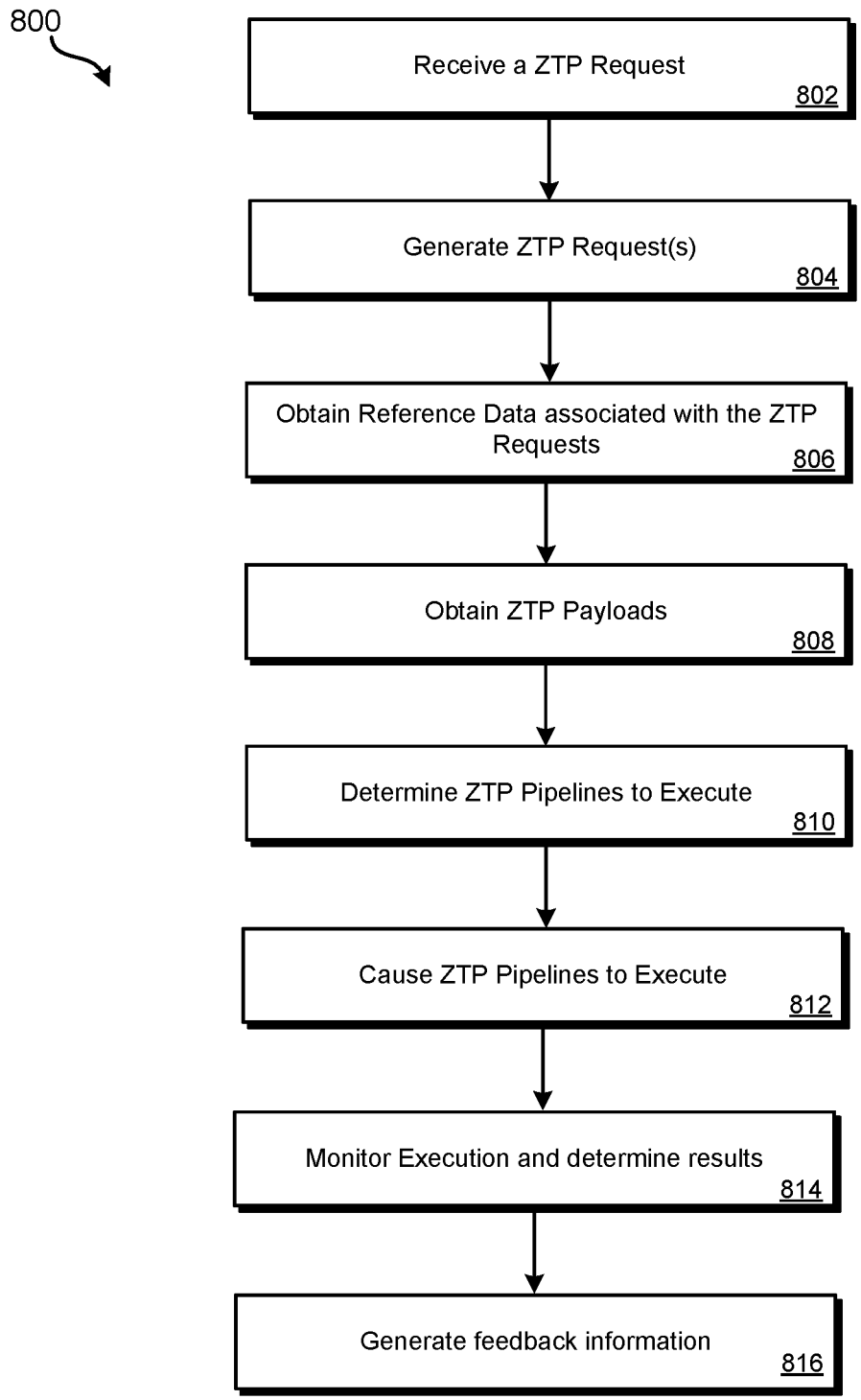
FIG. 8 illustrates an example of a method for orchestrating zero-touch provisioning of one or more components in an O-RAN in accordance with the present disclosure.

FIG. 8 illustrates an example of a method for orchestrating zero-touch provisioning of one or more components in an O-RAN in accordance with the present disclosure. At 802, a request to perform zero-touch provisioning (ZTP) for one or more components in an O-RAN is received. Some examples of ZTP in the O-RAN are illustrated in FIGS. 4A and 4B. It should be understood, as mentioned, zero-touch in accordance with the present disclosure does not necessarily mean no (what-so-ever) human intervention. It can mean no or little human intervention as compared to traditional component provisioning/updating. In some examples, the request at 802 is received from an interface provided in an O-RAN control console such as the ZTP control console 506 shown in FIG. 5. For instance, the interface enables a user (e.g., a network engineer of the O-RAN) to schedule installation of a cell site, a software update on a type of CSR (e.g., provided by a particular vendor) within the O-RAN, or some other operation(s). In other examples, the request is received from a component in the O-RAN when it is first brought on-line in the O-RAN. For instance, after a router is set up in a cell site and powered up, the router can send a request for provisioning itself to enable network activities for the cell site. Yet in other examples, the request at 802 can be sent from a vendor/developer with information regarding software release/update on a component provided by the vendor/developer. In that case, the request can be received from an interface between the O-RAN and a system of the vendor/developer, for example through the vendor ZTP adaptor 508 shown in FIG. 5. In yet other examples, the request may be to deploy one or more cell sites. As the ZTPO 504 orchestrates the different pipelines to deploy a cell site, requests can be generated by the components being installed that trigger the next operation and/or pipeline to execute. In some implementations, operations involved in 802 can be implemented by a ZTP control console substantially similar to or the same as the ZTP control console 506 described and illustrated herein.

At 804, one or more ZTP requests are generated based on the request received at 802. In some examples, the ZTPO 504 generates the requests. In various embodiments, the ZTP request(s) generated at 804 includes information regarding software to be provisioned or to be updated, location where such software is available, a time for the requested ZTP, one or more target components for the ZTP, and/or any other information. For example, as illustration, thus without limitation, after a request to release a version of software to a CSR provided by a particular vendor is received at 804, the ZTP request is generated to include information indicating where the version of the software is available (for example, in a software repository or pipeline storage), a specific time (e.g., at a certain time and date), and types of components (e.g., one or more types of the CSR provided by the particular vendor in the O-RAN and as well as any accessory components working with those types of CSR), and/or any other information. In a sense, the ZTP request generated at 804 substantiates the request received 802 with more specificity or instructions as to a content of the ZTP to be performed on the one or more target components. In some implementations, some information include in the ZTP request may be overlap with that in the request received at 802. For example, the user may already specify a time at 802 for the ZTP on the target components. In one embodiment, operations at 804 includes validation and confirmation as to whether the ZTP requested by the user can be performed in the O-RAN and returns an error to the user if it cannot be performed as requested, for example through the interface in the control console. In some implementations, operations involved in 804 can be implemented by a ZTP control console substantially similar to or the same as the ZTP control console 506 described and illustrated herein.

At 806, reference data is obtained by the ZTPO 504 based on the ZTP request generated at 804. As mentioned, one insight provided by the present disclosure is that reference data such as actual cell site construction inventory, RAN engineering specification, network planning, network design specification, Cloud infrastructure planning, network security implementation, transport circuit implementation, network implementation, and/or any other types of information regarding the O-RAN can be used to drive the ZTP in the O-RAN. For example, after the ZTP request is generated, actual cell site construction inventory information can be obtained, for example, from construction inventory 602 shown in FIG. 6. This information can be used to determine, for example, which components, how many of them, where they are in the O-RAN should be the targets of the ZTP request generated at 804. For instance, the ZTP request at 804 may specify "update Cisco CSR type 1 and CSR type 2 to a specific version of the CSR software provided by Cisco". According to this request, the actual construction inventory information is obtained so that it can be determined how many CSRs in the O-RAN are of type 1 and type 2 Cisco, where they are, and their installation status (e.g., installation complete/incomplete, powered up/down, and/or connected or disconnected), and/or any other information. In some implementations, operations involved in 806 can be implemented by a ZTP orchestrator substantially similar to or the same as the ZTPO 504 described and illustrated herein.

At 808, ZTP payload data is obtained by the ZTPO 504 according to the ZTP requests generated at 804. The ZTP payload data can include information indicating actual software package(s) to be installed/released/updated to one or more components in the O-RAN according to the ZTP request generated at 804, a link indicating a location where the software package(s) can be obtained, schedule information indicating when to release the software package(s), one or more test suites to be performed after the software package(s) are installed to the one or more components, distribution information regarding to how the ZTPO is to distribute the software package(s) to the one or more components in the O-RAN (e.g., where those components are located in the O-RAN), installation information indicating steps/procedures on how to install the software package(s) and/or any other ZTP payload information. In some situations, the ZTP payload data obtained at 808 is provided by a vendor or developer of the ZTP. In some situations, the ZTP payload data is generated within the O-RAN, for example, by the release/network/software engineers associated with an operator of the O-RAN. In some implementations, operations involved in 808 can be implemented by a ZTP orchestrator substantially similar to or the same as the ZTPO 504 described and illustrated herein.

At 810, one or more ZTP pipelines to execute are determined by the ZTPO 504. Examples of the ZTP pipelines/workflows include but are not limited to computer host provisioning (CHP) pipelines, virtual server management provisioning (VSMP) pipelines (e.g., VMware vCenter provisioning (VCP)) pipelines, node-pool creation (NPC) pipelines, distributed unit instantiation (DUI) pipelines, radio access network (RAN) initiation pipelines, and/or other pipelines. The different pipelines can include one or more specific instructions or steps to be executed for the software package(s) in the ZTP payload data to be installed on the one or more components in the O-RAN, one or more preinstallation checks before the software package(s) is installed on those components, one or more post-installation sanity checks to ensure the installation is successful, one or more procedures or steps to be followed in the event when the software package(s) is not successfully installed on an individual component, one or more commands to be executed in order for the software packages to be installed. For example, the one or more commands can include a command for restoring the component to the previous version of the software package(s) if the installation is not successful. In some implementations, operations involved in 810 can be coordinated by ZTPO 504 and implemented by an O-RAN ZTP adaptor substantially similar to or the same as the ZTP adaptors 510 described and illustrated herein.

At 812, the ZTP pipeline(s) identified at 810 are caused to be executed. For example, the ZTPO 504 may communicate with one or more O-RAN ZTP adaptors 510 that include commands for performing operations associated with the ZTP pipeline.

At 814, execution of the ZTP pipelines is monitored by the ZTPO 504 and one or more results of the ZTP operations associated with the execution of the ZTP pipelines can be determined. For example, the result(s) determined at 814 can indicate success, partial success, failure and/or any other types of status of the ZTP operation(s) carried out at 814. In some embodiments, the determination at 814 can involve obtaining one or more log records from the ZTP operations and extracting information from the log record(s) to determine the result(s) of the ZTP operation(s). In some implementations, operations involved in 814 can be implemented by an O-RAN ZTP adaptor substantially similar to or the same as the ZTP adaptors 510 described and illustrated herein.

At 816, feedback information can be generated based on the one or more results determined at 814. For example, feedback information indicating one or more stages in the O-RAN ZTP can be generated to help improve the ZTPO of the different components in the O-RAN. For instance, a result of certain failure in the ZTP operation(s) carried out at 812 can trigger generation of the feedback information. As illustration, without limitation, a component instance in a particular cell site or data center may not be working correctly and hence the ZTP operation(s) failed for that component instance. Feedback information indicating that future ZTP process should cause the ZTPO 504 to take this component instance off the update list until the component instance is reported as working correctly. In some implementations, operations involved in 816 can be implemented by the ZTPO and the O-RAN ZTP adaptor substantially similar to or the same as the ZTP adaptors 510 described and illustrated herein. In some examples, the feedback information can be used to automatically tickets. The tickets may then be programmatically distributed to the appropriate personnel to act upon.

Figure 9:
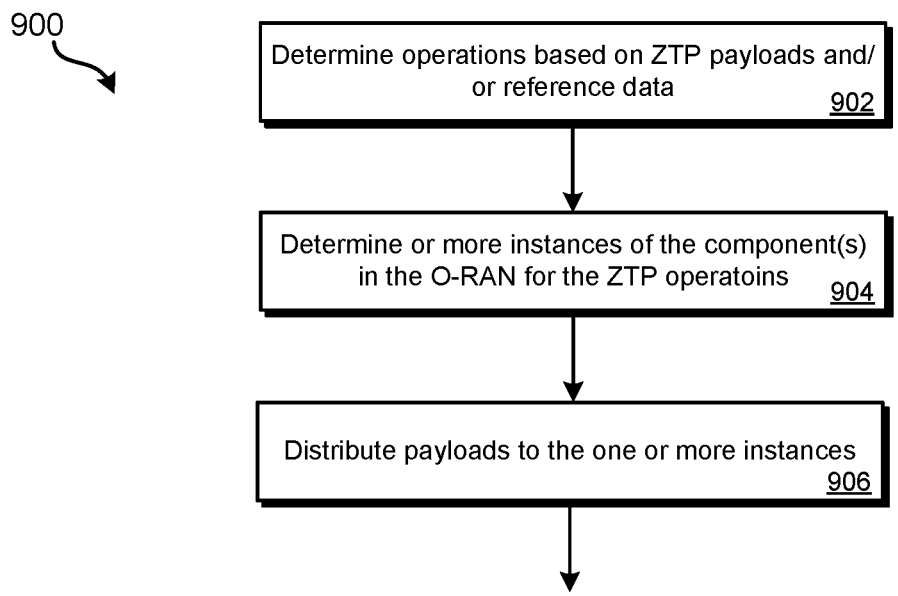
FIG. 9 illustrates an example of a method for orchestrating zero-touch provisioning of one or more components in an O-RAN in accordance with the present disclosure.

FIG. 9 illustrates an example of a method for orchestrating zero-touch provisioning of one or more components in an O-RAN in accordance with the present disclosure.

At 902, one or more ZTP operations are determined based on the ZTP payload data obtained at 808 and/or the reference data obtained at 806. Examples of the ZTP operations can include one or more specific instructions or steps to be executed for the software package(s) in the ZTP payload data to be installed on the one or more components in the O-RAN, one or more preinstallation checks before the software package(s) is installed on those components, one or more post-installation sanity checks to ensure the installation is successful, one or more procedures or steps to be followed in the event when the software package(s) is not successfully installed on an individual component, one or more commands to be executed in order for the software packages to be installed. For example, the one or more commands can include a command for restoring the component to the previous version of the software package(s) if the installation is not successful. In some implementations, operations involved in 902 can be implemented by an O-RAN ZTP adaptor substantially similar to or the same as the ZTP adaptors 510 described and illustrated herein.

At 904, one or more instances of components in the O-RAN are determined to be targets of the ZTP operations determined at 902. As mentioned, components in the O-RAN are typically provided by multiple vendors and/or developers. Some components may also be related to each other. For example, a particular installation or set up of a DU in a local data center may depend on a setup of one or more routers implemented in the local data center. In that example, a request to update the routers may also instigate updating of the DU co-located with those routers in the local data centers. In implementations, the determination at 904 may involve obtaining interdependencies between components, extracting vendor/developer information for target components of the ZTP operations determined at 904, and/or any other operations. In some implementations, operations involved in 904 can be implemented by an O-RAN ZTP adaptor substantially similar to or the same as the ZTP adaptors 510 described and illustrated herein.

At 906, payloads are distributed to the instances of components determined at 904 to carry out the ZTP operations determined at 902. In some embodiments, the payloads distributed at 906 include the ZTP payload data obtained at 808. In some embodiments, the payloads distributed at 906 includes data generated according to the ZTP operations determined at 902. For example, the payloads at 906 can include test data for testing the instances of components after the installation of the software package(s) to those instances. Other types of data that can be included in the payloads distributed at 906 are contemplated. In some implementations, operations involved in 906 can be implemented by an O-RAN ZTP adaptor substantially similar to or the same as the ZTP adaptors 510 described and illustrated herein.

FIGS. 10-15 illustrate orchestrating different ZTP pipelines, in accordance with some examples.

Figure 10:
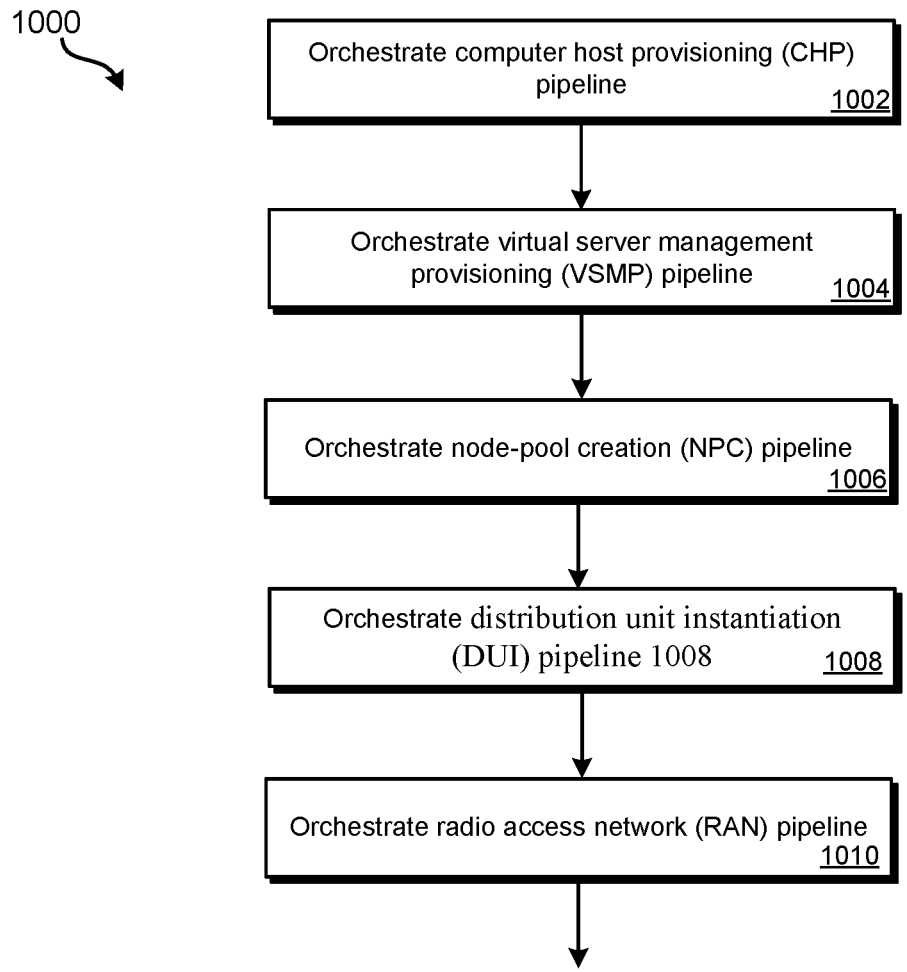
FIG. 10 illustrates an example of a method for orchestrating ZTP pipelines/workflows in accordance with the present disclosure.

FIG. 10 illustrates an example of a method for orchestrating ZTP pipelines/workflows in accordance with some examples. In this example, the pipeline 1000 comprises stages of computer host provisioning (CHP) pipeline 1002, a virtual server management provisioning (VSMP) pipeline (e.g., VMware vCenter provisioning (VCP)) pipeline 1004, a node-pool creation (NPC) pipeline 1006, distributed unit instantiation (DUI) pipeline 1008, and a radio access network (RAN) initiation pipeline 1010. While not illustrated, other pipelines/workflows can be included. In various embodiments, the pipelines 1000 are implemented by a ZTP orchestrator such as the ZTPO 302, or ZTPO 504 illustrated and described in FIGS. 3-7.

At 1002, the computer host provisioning pipeline is orchestrated. As discussed above, and in more detail with regard to FIG. 11, this CHP pipeline performs ZTP operations to provision the computer hosts (e.g., a server from a particular vendor). The computer hosts can be configured and set up from scratch so that they are brought into the core network to facilitate O-RAN. In various embodiments, the CHP pipeline 1002 are implemented by a ZTP orchestrator such as the ZTPO 302, or ZTPO 504 illustrated and described in FIGS. 3-7.

At 1004, the virtual server management (VSMP) pipeline is orchestrated. As discussed above, and in more detail with regard to FIG. 12, the VSMP pipeline performs ZTP operations to provisioning virtual server management functionality. In some examples, the VSMP pipeline performs ZTP operations to provision a VMware vCenter. vCenter is a server management software provided by VMware that provides a centralized platform for controlling VMware vSphere environments, that allows automation and delivering a virtual infrastructure across the O-RAN. In various embodiments, the VSMP pipeline 1002 is implemented by a ZTP orchestrator such as the ZTPO 302, or ZTPO 504 illustrated and described in FIGS. 3-7.

At 1006, the node-pool creation (NPC) pipeline is orchestrated. As discussed above, and in more detail with regard to FIG. 13, the NPC pipeline performs ZTP operations to create a node pool. A node pool is a group of nodes within a cluster that all have the same configuration. According to some configurations, the node pool is created for a Kubernetes cluster. In various embodiments, the NPC pipeline 1006 is implemented by a ZTP orchestrator such as the ZTPO 302, or ZTPO 504 illustrated and described in FIGS. 3-7.

At 1008, the distributed unit instantiation (DUI) pipeline is orchestrated. As discussed above, and in more detail with regard to FIG. 14, the DUI pipeline performs ZTP operations to a instantiate a distributed unit. A distributed unit (DU) provides support for lower layers of the protocol stack such as the RLC, MAC and Physical layer. In various embodiments, the DUI pipeline 1006 is implemented by a ZTP orchestrator such as the ZTPO 302, or ZTPO 504 illustrated and described in FIGS. 3-7.

At 1010, a radio access network (RAN) initiation pipeline is orchestrated. As discussed above, and in more detail with regard to FIG. 15, the RAN pipeline performs ZTP operations to configured for RAN a cell site. In various embodiments, the RAN pipeline 1006 is implemented by a ZTP orchestrator such as the ZTPO 302, or ZTPO 504 illustrated and described in FIGS. 3-7.

Figure 11:
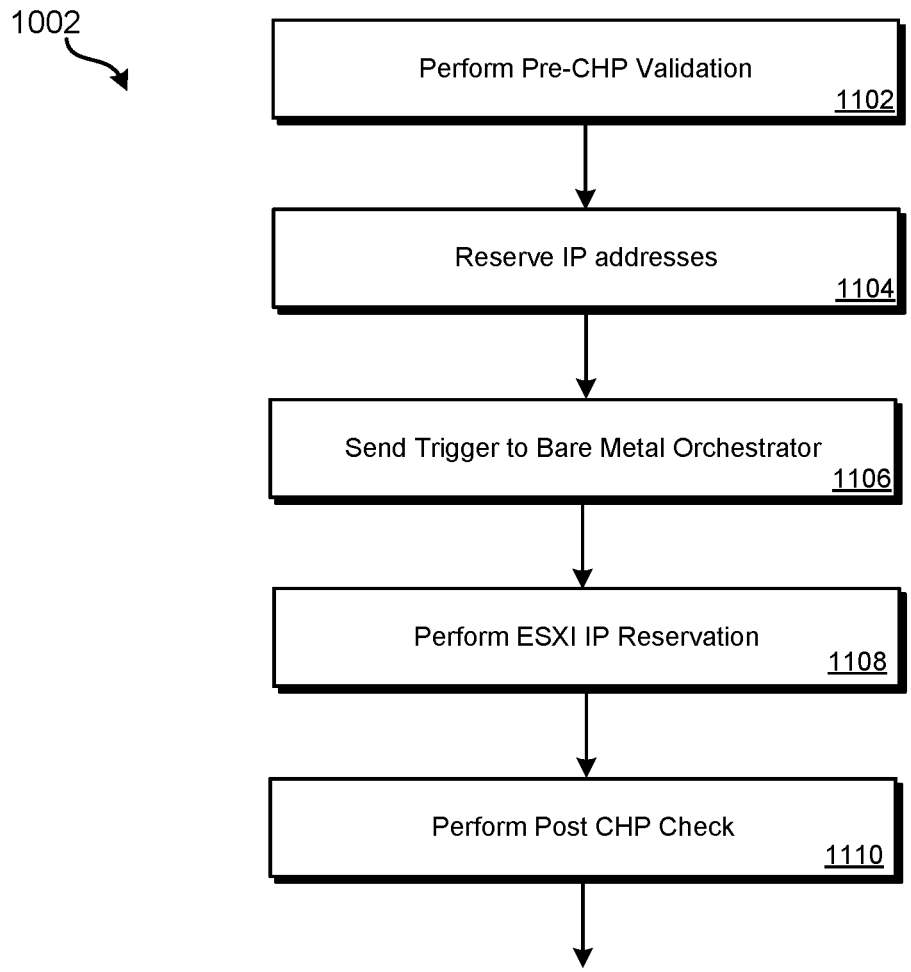
FIG. 11 illustrates an example of a method for orchestrating the computer host provisioning (CHP) pipeline stage in accordance with the present disclosure.

FIG. 11 illustrates an example of a method for orchestrating the computer host provisioning (CHP) pipeline stage in accordance with examples.

At 1102, a Pre-CHP validation is performed, for example, by a validation engine 312 shown in FIG. 3. In various embodiments, this validation may involve collecting data from the network management component, the site management component, the reference data system, and/or any other components as shown in FIGS. 2-7. For instance, for setting the particular CHP, information regarding the CHP should be ready in the network management component 308, the reference data 304, one or more software should be ready in the reference data component for deployment for that CHP, and/or any other checks.

At 1104, a range of IP addresses may be reserved for the one or more computer hosts being provisioned in the CHP stage. In various embodiments, the IP addresses can include IP V4 addresses and/or IP V6 addresses. In various embodiments, 604 operations for reserving IP addresses can be orchestrated by the ZTPO 502.

At 1106, a trigger is sent to an orchestrator to instruct the orchestrator that the one or more computer hosts can be provisioned.

At 1108, in some configurations, ESXI IP reservation is performed. ESXI is a component that can be installed on the one or more computer hosts as part of the provisioning and is provided by VMware. VMware ESXi partitions hardware of the computer hosts. 1108 reserves IP addresses for the ESXI to be installed on the computer hosts.

At 1110, post CHP validation is performed. In various embodiments, the post-CHP validation may involve pinging the computer hosts that have been provisioned in the CHP to ensure they are reachable, performing various sanity tests to ensure they function properly according to one or more roles they are assigned to in the O-RAN, identifying one or more issues in the CHP ZTP operations, and/or any other steps.

Figure 12:
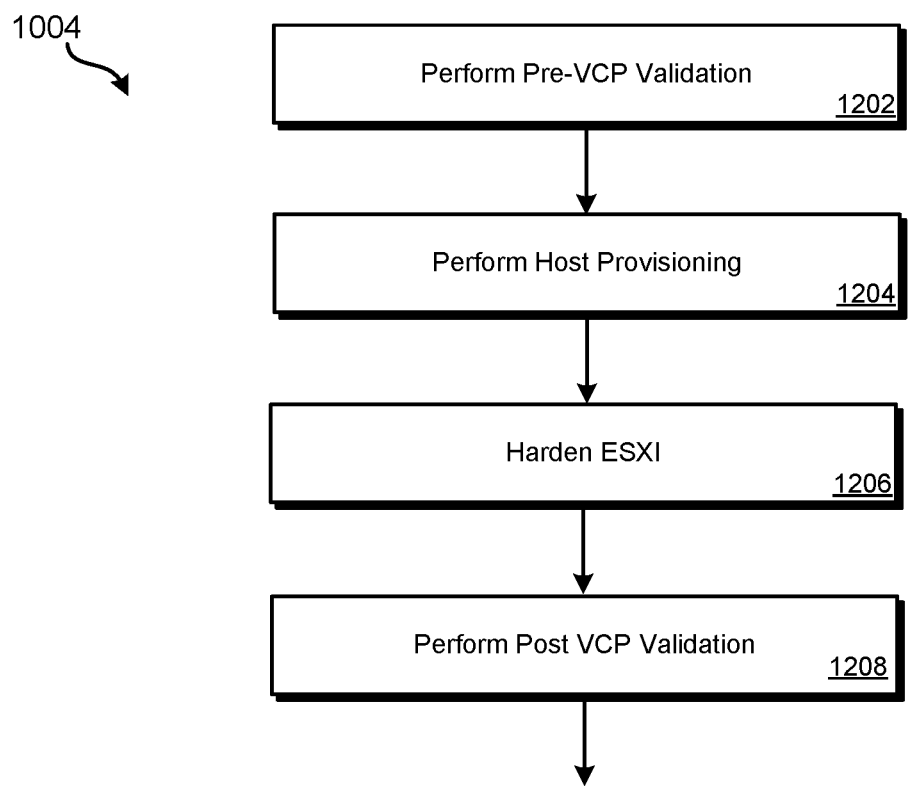
FIG. 12 illustrates an example of a method for orchestrating the virtual server management provisioning (VSMP) pipeline stage in accordance with the present disclosure.

FIG. 12 illustrates an example of a method for orchestrating the virtual server management provisioning (VSMP) pipeline stage in accordance with examples.

At 1202, a pre-VCP validation is performed. In various embodiments, this validation may involve collecting data from different components, such as the reference data system 502, and/or any other components as shown in FIGS. 2-7. For instance, for setting the particular vCenter, information regarding the vCenter should be ready in the reference data system, one or more software should be ready in the inventory management component for deployment for that vCenter, and/or any other checks.

At 1204, host provisioning in vCenter is performed. In some examples, host provisioning is performed in vCenter by VMware. This may involve configuring one or more virtual machines to facilitate a virtual environment. In various embodiments, a template is deployed for configuring a vCenter. In those embodiments, the template is a primary copy of a virtual machine to create and provision virtual machines.

At 1206, ESXI hardening is performed. This may involve enabling the ESXi, for example installed in the CHP, normal lockdown mode to prevent root access to the hosts over the network.

At 1208, a post-VCP validation is performed. This may involve using a workflow platform to check whether the vCenter provisioned in 504 is ready to facilitate the O-RAN.

Figure 13:
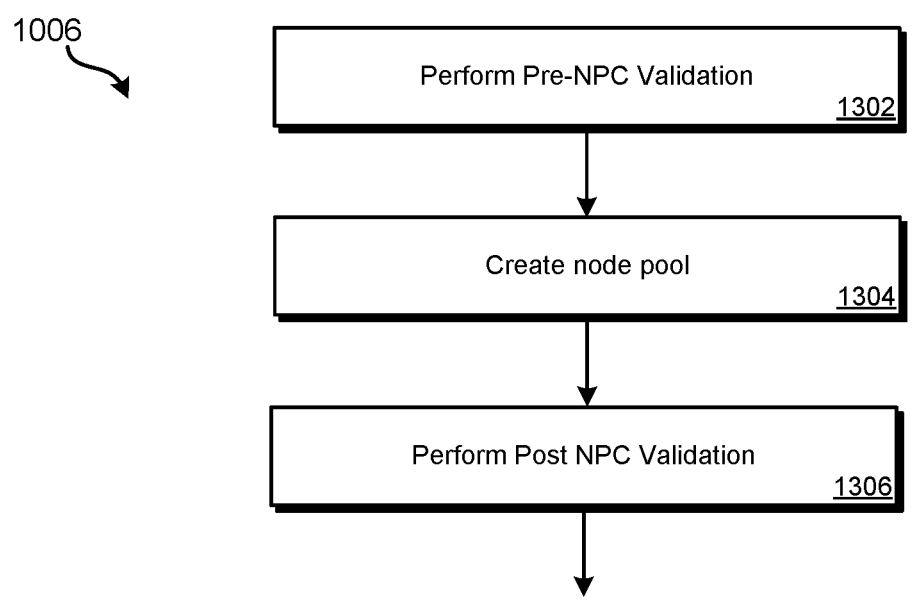
FIG. 13 illustrates an example of a method for orchestrating the node-pool creation (NPC) pipeline stage in accordance with the present disclosure.

FIG. 13 illustrates an example of a method for orchestrating of the node-pool creation (NPC) pipeline stage in accordance with examples. As briefly discussed above, a node pool is a group of nodes within a cluster that all have the same configuration.

At 1302, pre-NPC validation is performed. This may involve checking an identification for the node pool to be created is unique in the O-RAN, a number of nodes in the node pool is valid, the nodes are alive, various parameters for creating the node pool are available and set, and/or any other checks.

At 1304, the node pool/node-group is created. This may involve creating a node pool/group as the Kubernetes cluster, setting a volume for the node pool, specifying a path to the volume, and/or any other operations. At 1306, a post- NPC validation is performed. This may involve checking the node pool created at 1304 is alive and functions properly.

Figure 14:
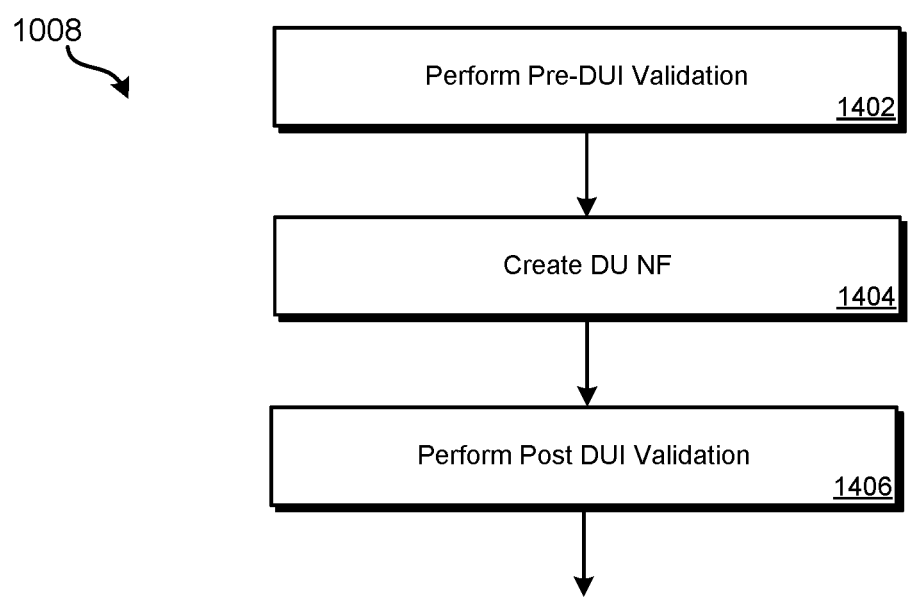
FIG. 14 illustrates an example of an example of a method for orchestrating the distributed unit instantiation (DUI) pipeline stage in accordance the present disclosure.

FIG. 14 illustrates an example of an example of a method for orchestrating the distributed unit instantiation (DUI) pipeline stage in accordance with examples.

At 1402, pre-DUI validation is performed. This may involve checking an identification for the DU to be created is unique in the O-RAN, various parameters for creating the DU are available and set, and/or any other checks.

At 1404, the DU is instantiated. This may involve configuring the DU to facilitate real-time baseband processing function. Various protocols can also be configured into the given DU, such as RLC, PDCP MAC and/or any other lower-level protocols. The DU is also configured to communicate with at least one RU in a cell site.

At 1406, a post-NPC validation is performed. This may involve checking the DU created at 1404 functions properly.

Figure 15:
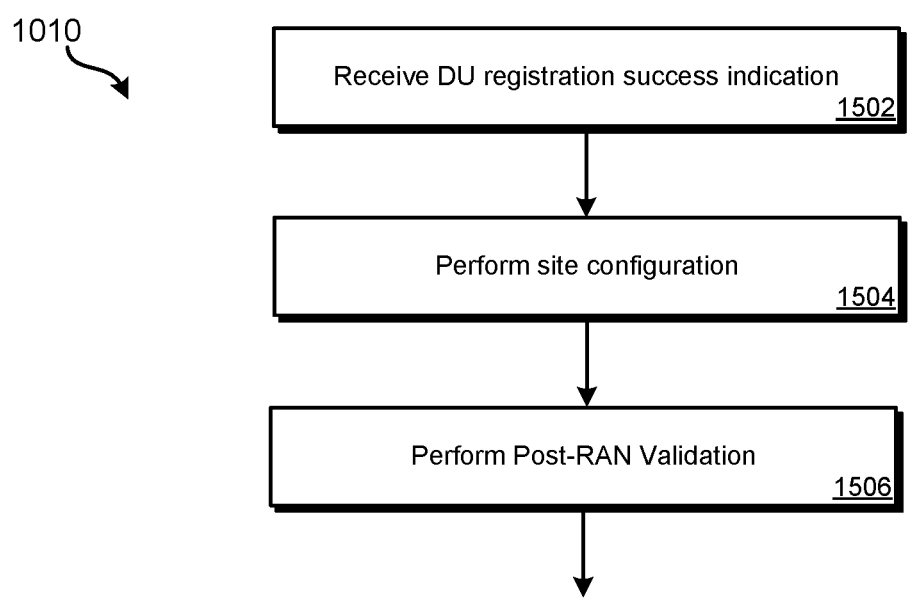
FIG. 15 illustrates an example of a method for orchestrating the radio access network (RAN) pipeline stage in accordance with the present disclosure.

FIG. 15 illustrates an example of a method for orchestrating the radio access network (RAN) pipeline stage in accordance with examples.

At 1502, a DU registration success indication is received. In some examples, the ZTPO, such as ZTPO 502, may receive a message indicating successful registration.

At 1504, a RAN is configured for a cell site using ZTP operations. One or more RUs, DUs, and a CU can create a gNodeB, which can serve as a radio access network (RAN).

At 1506, a post-RAN validation is performed. This may involve checking that the RAN created at 1504 functions properly.

Example Computing System

Figure 16:
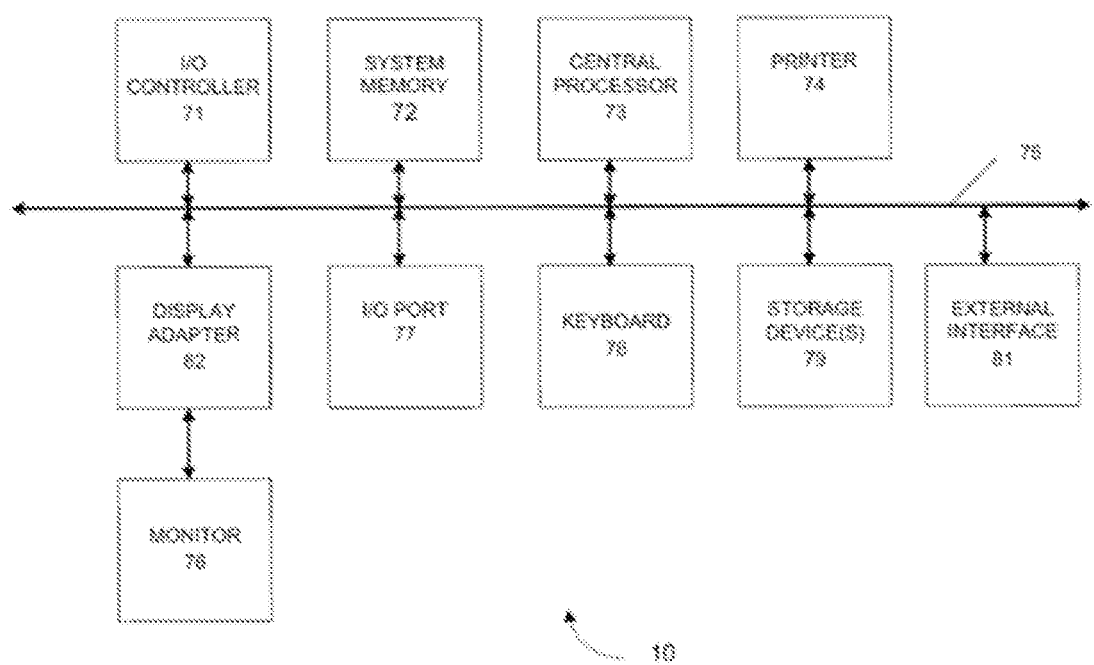
FIG. 16 generally illustrates an example computing platform that can be used to implement various components and methods described and illustrated herein.

Any of the embodiments mentioned herein may be implemented by or utilize any suitable number of subsystems. Examples of such subsystems are shown in FIG. 16 in computing system 10, which can be configured to implement various features and/or functions described herein. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 16 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A computer system configured to facilitate orchestration for zero-touch provisioning (ZTP) of open radio access network (O-RAN) components associated with cell sites of the O-RAN, wherein the computer system comprises at least one electronic processor configured to perform:
   receiving a request to perform zero-touch provisioning (ZTP) associated with deployment or configuration of a cell site;
   generating ZTP requests for components to be configured, provisioned, or updated in the O-RAN based on the request, wherein the components include one or more first components that perform a first functionality and are provided by a first vendor and one or more second components that perform the first functionality and are provided by a second vendor; and
   determining ZTP payload data according to the ZTP requests, wherein an individual ZTP payload includes one or more of computer instructions, or a software package, that cause one or more of the components in the O-RAN to be configured, provisioned, or updated or a software;
   causing at least one ZTP pipeline to execute, wherein the at least one ZTP pipeline performs ZTP operations associated with the deployment or configuration of the cell site, wherein the at least one ZTP pipeline includes operations for:
   setting up and provisioning one or more computing devices in individual ones of the cell sites; distributing ZTP payload data to one or more O-RAN components to carry out at least a portion of the ZTP operations, performing one or more distributed unit instantiation (DUI) operations to instantiate a distributed unit; and performing one or more radio access network (RAN) operations for the cell site;
   monitoring the execution of the at least one ZTP pipeline;
   determining one or more results associated with the execution of the at least one ZTP pipeline; and
   generating feedback information based on the one or more results of the ZTP operations.

2. The computer system of claim 1, wherein the at least one ZTP pipeline to execute includes a computer host provisioning (CHP) pipeline, a virtual server management provisioning (VSMP) pipeline, a node-pool creation pipeline, a distributed unit instantiation (DUI) pipeline, and a radio access network (RAN) initiation pipeline.

3. The computer system of claim 1, wherein the at least one electronic processor is further configured to perform:
   transmitting the ZTP payload data directly to a core network of the O-RAN.

4. The computer system of claim 2, wherein the at least one electronic processor is further configured to perform:
   obtaining reference data from an electronic data source, wherein the reference data includes data associated with one or more of a build/design specification, network specifications, planning data for one or more data centers or compute stacks, installation information that identifies how one or more of the components are installed in the cell site, O-RAN deployment data, or vendor data that includes one or more of specifications of hardware components or software components installed in the O-RAN to facilitate operations of the O-RAN; and
   determining one or more of the ZTP operations based on at least one of the reference data, or the ZTP payloads.

5. The computer system of claim 2, wherein the at least one electronic processor is further configured to perform providing a network operation center to show, within one or more user interfaces, a progress of the execution of the at least one ZTP pipeline.

6. The computer system of claim 1, wherein the at least one electronic processor is further configured to perform distributing ZTP payloads to one or more instances of the O-RAN components to carry out the ZTP operations associated with the execution of the at least one ZTP pipeline.

7. The computer system of claim 1, wherein the at least one electronic processor is further configured to perform:
   determining an occurrence of one or more errors associated with the execution of the at least one ZTP pipeline;
   causing one or more tickets to be generated based at least in part on the one or more errors; and
   distributing the one or more tickets to one or more other computing devices.

8. The computer system of claim 1, wherein individual ones of the at least one ZTP pipeline comprises operations for:
   performing a pre-check;
   triggering an execution of one or more ZTP operations based, at least in part on the pre-check; and
   performing a post-check that validates the execution of the one or more ZTP operations.

9. The computer system of claim 1, wherein the at least one electronic processor is further configured to perform causing a next pipeline to execute based on a determination that execution of a prior pipeline completed successfully.

10. A method for orchestrating zero-touch provisioning (ZTP) of open radio access network (O-RAN) components associated with cell sites, the method comprising:
   receiving, at a ZTP orchestrator (ZTPO), a request to perform zero-touch provisioning (ZTP) associated with deployment or configuration of a cell site within an O-RAN;

generating ZTP requests for components to be configured, provisioned, or updated in the O-RAN based on the request, wherein the components include one or more first components that perform a first functionality and are provided by a first vendor and one or more second components that perform the first functionality and are provided by a second vendor; and determining ZTP payload data according to the ZTP requests, wherein an individual ZTP payload includes one or more of computer instructions, or a software package, that cause one or more of the components in the O-RAN to be configured, provisioned, or updated or a software;

causing, via the ZTPO, at least one ZTP pipeline to execute, wherein the at least one ZTP pipeline performs ZTP operations associated with the request that include operations for: setting up and provisioning one or more computing devices in individual ones of the cell sites; distributing ZTP payload data to one or more O-RAN components to carry out at least a portion of the ZTP operations, performing one or more distributed unit instantiation (DUI) operations to instantiate a distributed unit; and performing one or more radio access network (RAN) operations for the cell site;

monitoring, via the ZTPO, the execution of the at least one ZTP pipeline;

determining, via the ZTPO, one or more results associated with the execution of the at least one ZTP pipeline;

triggering, via the ZTPO, a next pipeline; and generating, via the ZTPO, feedback information based on the one or more results of the ZTP operations.

11. The method of claim 10, further comprising transmitting the ZTP payload data directly to a core network of the O-RAN.

12. The method of claim 10, wherein the at least one ZTP pipeline to execute includes one or more of a computer host provisioning (CHP) pipeline, a virtual server management provisioning (VSMP) pipeline, a node creation pipeline, a distributed unit instantiation (DUI) pipeline, and a radio access network (RAN) initiation pipeline.

13. The method of claim 11, further comprising:
generating a request to obtain reference data from an electronic data source, wherein the reference data includes data associated with one or more of a build/design specification, network specifications, planning data for one or more data centers or compute stacks, installation information that identifies how one or more of the components are installed in the cell site, O-RAN deployment data, or vendor data that includes one or more of specifications of hardware components or software components installed in the O-RAN to facilitate operations of the O-RAN;
transmitting the request to the electronic data source; obtaining the reference data; and
determining the ZTP operations based on at least one of the reference data, or the ZTP payload data.

14. The method of claim 11, further comprising providing a network operation center to show, within one or more user interfaces, a progress of the execution of the at least one ZTP pipeline.

15. The method of claim 10, further comprising distributing, via the ZTPO, ZTP payloads to one or more instances of the O-RAN components to carry out the ZTP operations associated with the execution of the at least one ZTP pipeline.

16. The method of claim 10, further comprising:
determining an occurrence of one or more errors associated with the execution of the at least one ZTP pipeline;
causing one or more tickets to be generated based at least in part on the one or more errors; and
distributing the one or more tickets to one or more other computing devices.

17. The method of claim 10, wherein individual ones of the at least one ZTP pipeline comprise operations for:
performing a pre-check;
triggering an execution of one or more ZTP operations based, at least in part on the pre-check; and
performing a post-check that validates the execution of the one or more ZTP operations.

18. The method of claim 10, further comprising causing a next pipeline to execute based on a determination that execution of a prior pipeline completed successfully.

19. A non-transitory computer-readable medium configured to facilitate an orchestration of zero-touch provisioning (ZTP) of open radio access network (O-RAN) components associated with cell sites, and wherein the non-transitory computer-readable medium, when executed by a computer, causes the computer to:
receive, at a ZTP orchestrator (ZTPO), a request to perform zero-touch provisioning (ZTP) associated with deployment or configuration of a cell site within an O-RAN;
generate ZTP requests for components to be configured, provisioned, or updated in the O-RAN based on the request, wherein the components include one or more first components that perform a first functionality and are provided by a first vendor and one or more second components that perform the first functionality and are provided by a second vendor; and
determine ZTP payload data according to the ZTP requests, wherein an individual ZTP payload includes one or more of computer instructions, or a software package, that cause one or more of the components in the O-RAN to be configured, provisioned, or updated or a software;
cause, via the ZTPO, at least one ZTP pipeline to execute, wherein the at least one ZTP pipeline performs ZTP operations associated with the request that includes operations for: setting up and provisioning one or more computing devices in individual ones of the cell sites, distributing ZTP payload data to one or more O-RAN components to carry out at least a portion of the ZTP operations, performing one or more distributed unit instantiation (DUI) operations to instantiate a distributed unit, and performing one or more radio access network (RAN) operations for the cell site;
monitor, via the ZTPO, the execution of the at least one ZTP pipeline;
determine, via the ZTPO, one or more results associated with the execution of the at least one ZTP pipeline;
trigger, via the ZTPO, execution of a next pipeline; and
generate, via the ZTPO, feedback information based on the one or more results of the ZTP operations.

20. The non-transitory computer-readable medium of claim 19, wherein the at least one ZTP pipeline to execute include one or more of a computer host provisioning (CHP) pipeline, a virtual server management provisioning (VSMP) pipeline, a node-pool creation (NPC) pipeline, a distributed unit instantiation (DUI) pipeline, and a radio access network (RAN) initiation pipeline.

* * * * *